US010107026B2

(12) United States Patent
Dezorzi et al.

(10) Patent No.: US 10,107,026 B2
(45) Date of Patent: Oct. 23, 2018

(54) METHOD AND SYSTEM FOR OPERATING A CLOSURE PANEL OF A VEHICLE

(71) Applicant: Magna Closures Inc., Newmarket (CA)

(72) Inventors: Timothy Dezorzi, South Lyon, MI (US); Erik Schattenmann, Toronto (CA); Spiridon-sorin S. Tudora, Richmond Hill (CA); Stephen James Caron, Aurora (CA); Mirko Pribisic, North York (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 15/986,223

(22) Filed: May 22, 2018

(65) Prior Publication Data

US 2018/0266165 A1   Sep. 20, 2018

Related U.S. Application Data

(63) Continuation of application No. 15/845,309, filed on Dec. 18, 2017, now Pat. No. 9,982,474, which is a (Continued)

(51) Int. Cl.
| | |
|---|---|
| *B60R 25/00* | (2013.01) |
| *E05F 15/76* | (2015.01) |
| *G07C 9/00* | (2006.01) |
| *E05F 15/77* | (2015.01) |
| *E05F 15/73* | (2015.01) |
| *B60R 25/24* | (2013.01) |
| *B60R 25/20* | (2013.01) |
| *B60R 25/01* | (2013.01) |
| *B60J 5/10* | (2006.01) |

(52) U.S. Cl.
CPC .............. *E05F 15/76* (2015.01); *B60R 25/01* (2013.01); *B60R 25/2054* (2013.01); *B60R 25/241* (2013.01); *E05F 15/73* (2015.01); *E05F 15/77* (2015.01); *G07C 9/00111* (2013.01); *B60J 5/101* (2013.01); *E05Y 2400/44* (2013.01); *E05Y 2400/852* (2013.01); *E05Y 2900/546* (2013.01)

(58) Field of Classification Search
CPC ........... E05F 15/70; E05F 15/77; E05F 15/78; G07C 9/00; G07C 9/00007; G07C 9/00111
USPC ............ 340/426.24, 426.28, 539.22, 539.23, 340/686.1, 686.6
See application file for complete search history.

(56) References Cited

U.S. PATENT DOCUMENTS

| | | | |
|---|---|---|---|
| 9,359,795 B1 | 6/2016 | Gutierrez et al. | |
| 9,605,471 B2 | 3/2017 | Salter et al. | |

(Continued)

OTHER PUBLICATIONS

International Search Report dated Feb. 17, 2015 in International Patent Application Serial No. PCT/IB2014/001977.

*Primary Examiner* — Carlos E Garcia
(74) *Attorney, Agent, or Firm* — Dickinson Wright PLLC

(57) ABSTRACT

A method for operating a closure panel of a vehicle, comprising: using a processor, determining whether a first proximity sensor and a second proximity sensor located on a periphery of the vehicle have been sequentially activated to indicate an object moving across the first proximity sensor and the second proximity sensor; and, controlling the closure panel to open or close when the first proximity sensor and the second proximity sensor have been sequentially activated.

20 Claims, 21 Drawing Sheets

Related U.S. Application Data continuation of application No. 15/477,272, filed on Apr. 3, 2017, now Pat. No. 9,845,632, which is a continuation of application No. 14/890,184, filed as application No. PCT/IB2014/001977 on May 14, 2014.

(60) Provisional application No. 61/823,533, filed on May 15, 2013, provisional application No. 61/865,027, filed on Aug. 12, 2013, provisional application No. 61/919,412, filed on Dec. 20, 2013.

(56) References Cited

U.S. PATENT DOCUMENTS

| | | |
|---|---|---|
| 2005/0162115 A1 | 7/2005 | Pendergrass |
| 2005/0168322 A1 | 8/2005 | Appenrodt et al. |
| 2006/0136997 A1 | 6/2006 | Telek et al. |
| 2008/0068145 A1 | 3/2008 | Weghaus et al. |
| 2009/0256677 A1 | 10/2009 | Hein et al. |
| 2011/0012744 A1 | 1/2011 | Buss |
| 2011/0118946 A1 | 5/2011 | Reimann et al. |
| 2011/0276234 A1 | 11/2011 | Van Gastel |
| 2012/0123649 A1 | 5/2012 | Eggers et al. |
| 2012/0158253 A1 | 6/2012 | Kroemke et al. |
| 2012/0313901 A1 | 12/2012 | Monson |
| 2013/0213100 A1 | 8/2013 | Cohen |
| 2014/0000165 A1 | 1/2014 | Patel et al. |
| 2014/0022052 A1 | 1/2014 | Lim et al. |
| 2014/0285217 A1 | 9/2014 | Van Gastel et al. |
| 2014/0320823 A1 | 10/2014 | Ammar et al. |
| 2015/0012176 A1 | 1/2015 | Schindler et al. |
| 2015/0033846 A1 | 2/2015 | Tran et al. |
| 2015/0120151 A1 | 4/2015 | Akay et al. |
| 2016/0012654 A1 | 1/2016 | Sherony |
| 2016/0083995 A1* | 3/2016 | Dezorzi ............ E05F 15/73 340/5.72 |

\* cited by examiner

METHOD AND SYSTEM FOR OPERATING A CLOSURE PANEL OF A VEHICLE

CROSS-REFERENCE TO RELATED APPLICATIONS

This application is a continuation of U.S. patent application Ser. No. 15/845,309 filed Dec. 18, 2017, which is a continuation of U.S. patent application Ser. No. 15/477,272 filed Apr. 3, 2017, which is a continuation of U.S. patent application Ser. No. 14/890,184 filed Nov. 10, 2015, which is a National Stage of International Application No. PCT/IB2014/001977 filed May 14, 2014, which claims priority from and the benefit of the filing date of U.S. Provisional Patent Application No. 61/823,533, filed May 15, 2013, U.S. Provisional Patent Application No. 61/865,027, filed Aug. 12, 2013, and U.S. Provisional Patent Application No. 61/919,412, filed Dec. 20, 2013. The entire disclosure of each of the above applications is incorporated herein by reference.

FIELD OF THE INVENTION

This invention relates to the field of hands-free operation of devices, and more specifically, to a method and system for operating closure panels of vehicles and other devices.

BACKGROUND

In motor vehicles such as minivans, sport utility vehicles and the like, it has become common practice to provide the vehicle body with a large rear opening. A liftgate (also referred to as a tailgate or closure panel) is typically mounted to the vehicle body or chassis with hinges for pivotal movement about a transversely extending axis between an open position and a closed position. Typically, the liftgate may be operated manually or with a power drive mechanism including a reversible electric motor.

Systems exist for providing assistance in opening or for automatically opening the liftgate of vehicles. These systems make use of manually-actuated remote controls and typically require at least one hand of a user or operator to be available. This can be problematic if the user is carrying a load to be placed in the vehicle via the liftgate. In addition, systems exist which use sensors mounted under the rear bumper of the vehicle which may be activated to open the liftgate by a user waving their foot under the bumper. However, these systems can be complex when attempting to avoid unintentional operation.

A need therefore exists for an improved method and system for operating closure panels of vehicles and other devices. Accordingly, a solution that addresses, at least in part, the above and other shortcomings is desired.

SUMMARY

According to one aspect of the disclosure, there is provided a method for operating a closure panel of a vehicle, comprising: using a processor, determining whether a first proximity sensor and a second proximity sensor located on a periphery of the vehicle have been sequentially activated to indicate an object moving across the first proximity sensor and the second proximity sensor; and, controlling the closure panel to open or close when the first proximity sensor and the second proximity sensor have been sequentially activated.

In accordance with further aspects of the disclosure, there is provided an apparatus such as a controller, a method for adapting same, as well as articles of manufacture such as a computer readable medium or product and computer program product or software product (e.g., comprising a non-transitory medium) having program instructions recorded thereon for practising the method of the disclosure.

BRIEF DESCRIPTION OF THE DRAWINGS

Features and advantages of the embodiments of the present disclosure will become apparent from the following detailed description, taken in combination with the appended drawings, in which.

It will be noted that throughout the appended drawings, like features are identified by like reference numerals.

DETAILED DESCRIPTION OF EXAMPLE EMBODIMENTS

In the following description, details are set forth to provide an understanding of the disclosure. In some instances, certain software, circuits, structures, techniques and methods have not been described or shown in detail in order not to obscure the disclosure. The term "controller" is used herein to refer to any machine for processing data, including the data processing systems, computer systems, electronic control units ("ECUs"), and network arrangements described herein. The present disclosure may be implemented in any computer programming language provided that the operating system of the controller provides the facilities that may support the requirements of the present disclosure. Any limitations presented would be a result of a particular type of operating system or computer programming language and would not be a limitation of the present disclosure. The present disclosure may also be implemented in hardware or in a combination of hardware and software.

Figure 1:
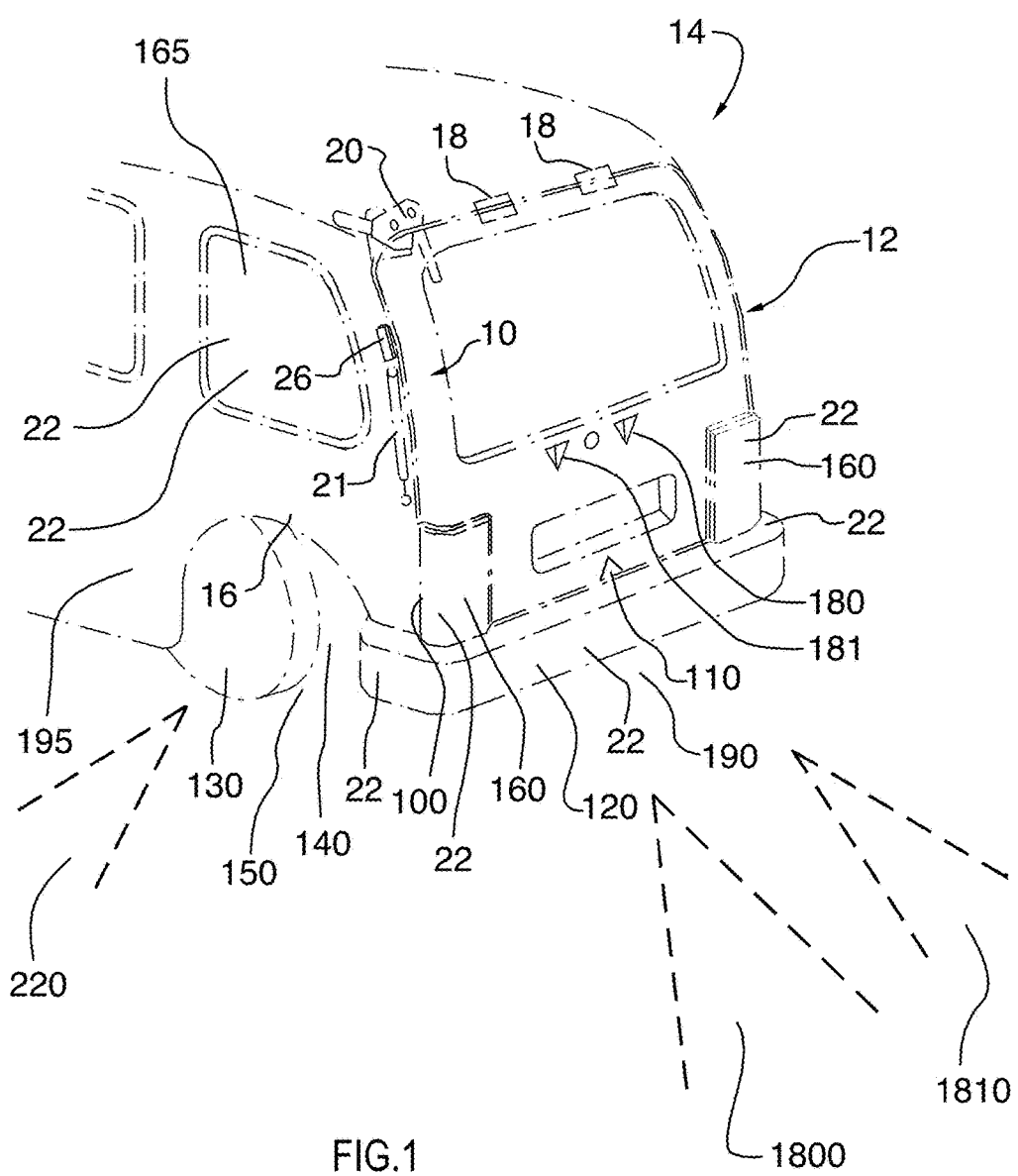
FIG. 1 is rear perspective view illustrating a hands-free operation system for a liftgate of a vehicle in accordance with an example embodiment of an aspect of the disclosure.
Figure 2:
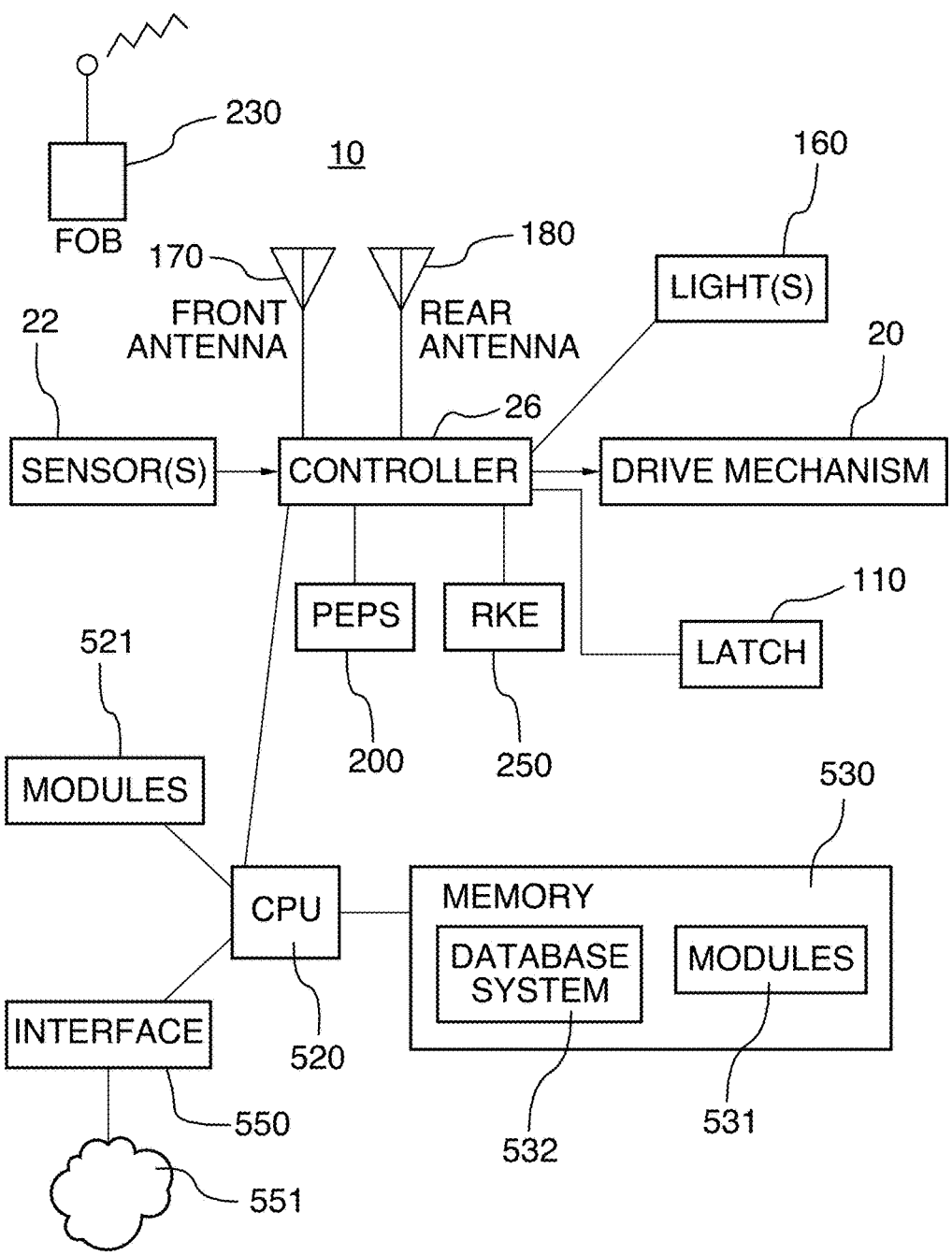
FIG. 2 is a block diagram illustrating the hands-free operation system of FIG. 1 in accordance with an example embodiment of an aspect of the disclosure.

FIG. 1 is rear perspective view illustrating a hands-free operation system 10 for a liftgate 12 of a vehicle 14 in accordance with an example embodiment of an aspect of the disclosure. And, FIG. 2 is a block diagram illustrating the hands-free operation system 10 of FIG. 1 in accordance with an example embodiment of an aspect of the disclosure.

The hands-free operation system 10 is shown operatively associated with a closure panel 12 of a motor vehicle 14. According to one example embodiment, the closure panel is a liftgate 12. It will be understood by those skilled in the art that the hands-free operation system 10 may be used with other closure panels and windows of a vehicle or other device.

The liftgate 12 is mounted to the body 16 of the vehicle through a pair of hinges 18 to pivot about a transversely extending pivot axis with respect to a large opening 100 in the rear of the body 16. The liftgate 12 is mounted to articulate about its hinge axis between a closed position where it closes the opening 100 and an open position where it uncovers the opening 100 for free access to the vehicle body interior and assumes a slightly upwardly angled position above horizontal. The liftgate 12 is secured in its closed position by a latching mechanism or latch 110. The latch 110 must be released or unlocked for the liftgate 12 to open. The liftgate 12 is opened and closed by a drive mechanism 20 with the optional assist of a pair of gas springs 21 connected between the liftgate 12 and the body 16. The drive mechanism 20 may be similar to that described in PCT International Patent Application No. PCT/CA2012/000870, filed Sep. 20, 2012, and the entire content of which is incorporated herein by reference. The drive mechanism 20 may be or include a powered strut 21 as described in U.S. Pat. No. 7,938,473, issued May 20, 2011, and incorporated herein by reference.

According to one example embodiment, the hands-free operation system 10 includes one or more proximity sensors 22 and a controller (or electronic control unit ("ECU")) 26. Each sensor 22 may be positioned in the rear bumper 120, for example in the bumper skin or fascia, of the vehicle facing the rear wheel 130 to cover an area or volume 140 of the rear wheel-well 150 between the bumper 120 and the rear wheel 130. The sensors 22 may be electrically coupled to an optional wire harness (not shown) adapted to plug into the controller 26. The controller 26 controls the latch 110 and drive mechanism 20 to open the liftgate 12 in the event it receives an appropriate electrical signal from one or more of the sensors 22 and other elements of the system 10. Each sensor 22 may have an associated proximity range 220 within which it may sense an object (e.g., a user's foot, etc.).

The controller 26 includes a processor or central processing unit ("CPU") 520, memory 530, and an interface device 550. The memory 530 may include a variety of storage devices including internal memory and external mass storage typically arranged in a hierarchy of storage as understood by those skilled in the art. For example, the memory 530 may include databases, random access memory ("RAM"), read-only memory ("ROM"), flash memory, and/or disk devices. The interface device 550 may include one or more network connections. The controller 26 may be adapted for communicating with other data processing systems (e.g., similar to controller 26) over a network 551 via the interface device 550. For example, the interface device 550 may include an interface to a network 551 such as a local area network ("LAN"), etc. As such, the interface 550 may include suitable transmitters, receivers, etc. Thus, the controller 26 may be linked to other data processing systems by the network 551. The CPU 520 may include or be operatively coupled to dedicated coprocessors, memory devices, or other hardware modules 521. The CPU 520 is operatively coupled to the memory 530 which stores an operating system (e.g., 531) for general management of the controller 26. The controller 26 may include a data store or database system 532 for storing data and programming information. The database system 532 may include a database management system (e.g., 532) and a database (e.g., 532) and may be stored in the memory 530 of the controller 26. In general, the controller 26 has stored therein data representing sequences of instructions which when executed cause the method described herein to be performed. Of course, the controller 26 may contain additional software and hardware a description of which is not necessary for understanding the invention.

Thus, the controller 26 includes computer executable programmed instructions for directing the controller 26 to implement the embodiments of the present disclosure. The programmed instructions may be embodied in one or more hardware modules 521 or software modules 531 resident in the memory 530 of the controller or elsewhere (e.g., 520). Alternatively, the programmed instructions may be embodied on a computer readable medium or product (e.g., a memory stick, etc.) which may be used for transporting the programmed instructions to the memory 530 of the controller 26. Alternatively, the programmed instructions may be embedded in a computer-readable signal or signal-bearing medium or product that is uploaded to a network 551 by a vendor or supplier of the programmed instructions, and this signal or signal-bearing medium may be downloaded through an interface (e.g., 550) to the controller 26 from the network 551 by end users or potential buyers.

In operation, when a user waves his or her foot in the volume 140 of the wheel-well 150 proximate to a sensor 22, the sensor 22 is activated. Alternatively, the sensor 22 may be directed for activation adjacent the side of the vehicle 14 such that standing beside the vehicle 14 may activate the sensor 22 without requirement to wave the foot in the volume 140 or under the vehicle 14. The activation of a sensor 22 is detected by the controller 26. In response, and upon the user moving to the rear 190 of the vehicle 14 and being detected and authenticated there, the controller 26 releases the latch 110 and operates the drive mechanism 20 to move the liftgate 12 to its open position. For more secure activation, the vehicle 14 may attempt to authenticate the user when the proximity sensor 22 is activated and to ensure the user is not behind the vehicle 14 while another object separate from the user is in proximity of the sensor 22. The vehicle 14 may then attempt to authenticate the user at the rear liftgate 12 within a given amount of time following activation of the sensor 22, and then release the latch 110, if necessary, and move the liftgate 12 to the open position.

The latch 110 and drive mechanism 20 are controlled in part by the hands-free operation system 10. It will be appreciated by those skilled in the art that the hands-free operation system 10 may be applied to any motorized or automated closure panel structure that moves between an open position and a closed position. For example, a non-exhaustive list of closure panels includes window panes, sliding doors, tailgates, sunroofs and the like. For applications such as window panes or sun roofs, the sensor 22 may be mounted on the body 16 of the vehicle 14, and for applications such as powered liftgates and sliding doors the sensor 22 may be mounted on or within the bumper 120.

The sensors 22 may come in different forms, including non-contact proximity sensors which are typically based on capacitance changes. These are referred to as capacitive sensors in the following.

Capacitive sensors typically include a conductive strip, including, for example, a metal strip or wire. The conductive strip may be embedded in a non-conductive material, such as a non-conductive plastic or rubber strip, which is routed along and adjacent to the periphery of the bumper 120 or wheel-well 150. The metal strip or wire and the chassis of the vehicle may collectively form the two plates of a sensing capacitor. Alternatively, the sensor 22 may incorporate two discrete electrodes separately, or embedded together within the non-conductive material. An example of such a sensor 22 is described below. An obstacle placed near these two electrodes changes the dielectric constant and thus varies the amount of charge stored by the sensing capacitor over a given period of time. The charge stored by the sensing capacitor is transferred to a reference capacitor in order to detect the presence of the obstacle. The capacitive sensor is typically driven by a pulsed signal from a controller 26. Example sensors and possible mountings to a fascia are described in U.S. Patent Application No. 61/791,472 by Pribisic, et al., filed Mar. 15, 2013, the entire content of which is hereby incorporated by reference, and in U.S. Patent Application No. 61/791,322 by Pribisic et al., filed Mar. 15, 2013, the entire content of which is hereby incorporated by reference. Example driving of a sensor, particularly to minimize electrical noise, is described in U.S. Patent Application No. 61/791,779 by Pribisic et al., filed Mar. 15, 2013, the entire content of which is hereby incorporated by reference. It is to be recognized that these are only example capacitive sensors 22 and other capacitive proximity sensors, or non-capacitive proximity sensors, such as, for example, optical sensors, acoustic sensors, or radio frequency (fob based) sensors could be used.

The controller 26 may be a separate electronic control unit ("ECU") or may be coupled to or incorporated in the vehicle's main or central ECU system (e.g., a vehicle ECU, a body control module ("BCM"), etc.). The controller 26 may be coupled to an authentication system, such as a passive entry passive start ("PEPS") type system 200, a remote keyless entry ("RKE") system 250, a front end antenna 170 associated with at least one of the PEPS system 200 and the RKE system 250, and a rear end antenna 180 also associated with at least one of the PEPS system 200 and the RKE system 250. For reference, both the PEPS system 200 and the RKE system 250 work with an electronic keyfob or fob 230 that is located with the user. The PEPS and/or RKE systems 200, 250 receive signals from the fob 230 through one or more of the front and rear antennae 170, 180 to initiate an operation such as, for example, controlling the liftgate 12 to open or close, etc. In general, a PEPS system 200 does not require the user to push a button on the fob 230 to initiate an operation. In contrast, a RKE system 250 does require the user to push a button on the fob 230 to initiate an operation. According to one example embodiment, the PEPS system 200 is a stand-alone, unmodified system coupled to the antennae 170, 180 and the controller 26 intercepts required signals from the PEPS system 200 to implement the method of the example embodiment.

Figure 3:
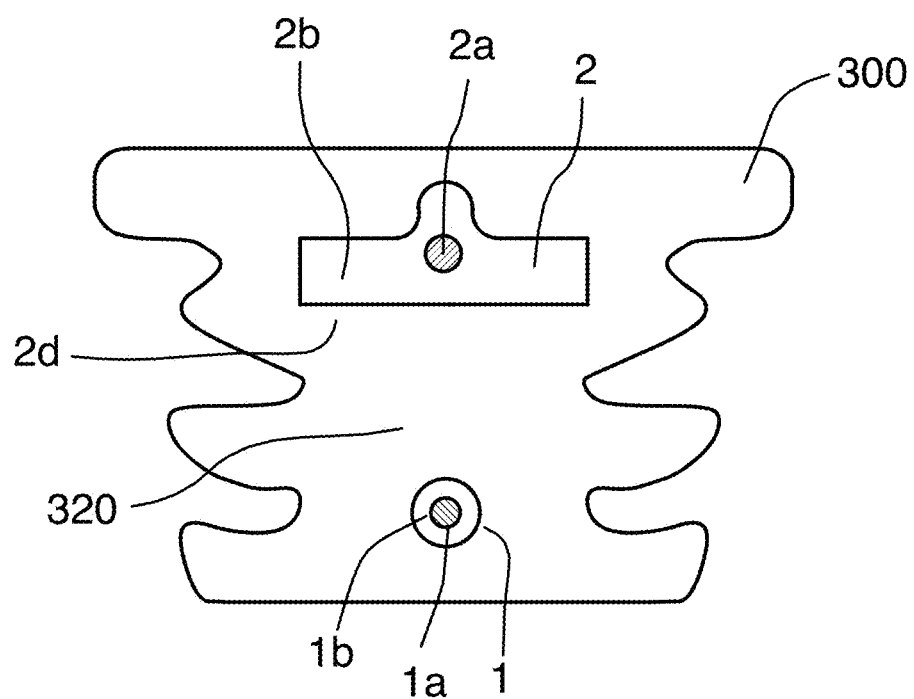
FIG. 3 is a cross sectional view illustrating a capacitive sensor in accordance with an example embodiment of an aspect of the disclosure.

FIG. 3 is a cross sectional view illustrating a capacitive sensor 22 in accordance with an embodiment of an aspect of the invention. The capacitive sensor 22 is a two electrode sensor that allows for a capacitive mode of obstacle detection. In general, the two electrodes 1, 2 function in a driven shield configuration (i.e., with the upper electrode 2 being the driven shield). The case 300 positions the two electrodes 1, 2 in an arrangement that facilitates operation of the sensor 22 in a capacitive mode. The lower electrode 1 (optionally comprising a conductor 1a embedded in conductive resin 1b) acts as a capacitive sensor electrode, and the upper electrode 2 (optionally comprising a conductor 2a embedded in a conductive resin 2b) acts as a capacitive shield electrode. A dielectric 320 (e.g., a portion 320 of the case 300) is disposed between the capacitive shield electrode 2 and the capacitive sensor electrode 1 to isolate and maintain the distance between the two. The controller 26 is in electrical communication with the electrodes 1, 2 for processing sense data received therefrom. Accordingly to one embodiment, the capacitive sensor 22 may be similar to that described in U.S. Pat. No. 6,946,853 to Gifford et al., issued Sep. 20, 2005, and incorporated herein by reference.

According to one embodiment, the capacitive sensor 22 includes an elongate non-conductive case 300 having two elongate conductive electrodes 1, 2 extending along its length. The electrodes 1, 2 are encapsulated in the case 300 and are spaced apart. When an obstacle such as a user's foot enters the volume 140 between the bumper 120 and the wheel 130 of vehicle 14, it effects the electric field generated by the capacitive sensor electrode 1 which results in a change in capacitance between the two electrodes 1, 2 which is indicative of the proximity of the obstacle to the wheel 130 and bumper 120. Hence, the two electrodes 1, 2 function as a capacitive non-contact or proximity sensor.

According to one embodiment, the capacitive sensor electrode 1 may include a first conductor 1a embedded in a first partially conductive body 1b and the capacitive shield electrode 2 may include a second conductor 2a embedded in a second partially conductive body 2b. The conductors 1a, 2a may be formed from a metal wire. The partially conductive bodies 1b, 2b may be formed from a conductive resin. And, the case 300 may be formed from a non-conductive (e.g., dielectric) material (e.g., rubber, etc.). Again, the capacitive sensor electrode 1 is separated from the capacitive shield electrode 2 by a portion 320 of the case 300.

With respect to capacitive sensing, a portion 320 of the case 300 electrically insulates the capacitive sensor electrode 1 and the capacitive shield electrode 2 so that electrical charge can be stored therebetween in the manner of a conventional capacitor. According to one embodiment, the inner surface 2d of the capacitive shield electrode 2 may be shaped to improve the shielding function of the electrode 2. According to one embodiment, the inner surface 2d may be flat as shown in FIG. 3.

The sensor 22 is used by the controller 26 to measure a capacitance (or capacitance value) relating to an electric field extending through the volume 140 between the bumper 120 and the wheel 130. According to one embodiment, the capacitive shield electrode 2 functions as a shielding electrode since it is positioned closer to the sheet metal of the body 16. As such, the electric field sensed by the capacitive sensor electrode 1 will be more readily influenced by the closer capacitive shield electrode 2 than the vehicle sheet metal.

According to another embodiment, the sensors 22 may be optical sensors, ultrasonic sensors, motion detectors, or any other form of sensor that can detect a user's foot within the volume 140 of the wheel-well 150 between the bumper 120 and wheel 130.

The system 10 includes a two step method of operation. First, the intent of a user to operate the liftgate 12 hands-free is determined. A user may show this intent by waving his or her foot in the volume 140 at the side 195 of the vehicle 14. This intent is referred to herein as a "hands-free operation gesture" or simply "gesture". The detection of the presence of a tree, for example, by the system 10 would lack the necessary intent to be a hands-free operation gesture. Second, the user is authenticated to establish that he or she is allowed to operate the liftgate 12 hands-free. A user may indicate his or her identity though his or her possession of a fob 230 associated with the system 10 and/or vehicle 14. The fob 230 is authenticated by the system 10 (e.g., by the PEPS system 200) when the user subsequently moves to the rear 190 of the vehicle 14. Note that the user signals his or her intent to operate the liftgate 12 hands-free while outside of the rear antenna 180 range 1800 of the PEPS system 200. Each antenna 170, 180 may have an associated authentication range 1700, 1800 within which a fob 230 may be authenticated.

According to one embodiment of the operation of the system 10, first, the sensor 22 is located in the bumper 22 out of range of the liftgate 12. The bumper 22 of the vehicle is non-conductive and the sensor 22 may be a trim sensor. Second, the user activates the sensor 22. Third, visual feedback indicating activation of the sensor 22 is provided to the user. Fourth, the user moves with his or her fob 230 in range of the rear antenna 180 of the PEPS system 200 at the liftgate 12. Fifth, the user is authenticated and the liftgate 12 opens.

Intent may also be inferred from an approach to the proximity sensor 22 followed by approach to the rear authentication antenna as discussed in this paragraph and later below. Approach to the proximity sensor 22 may be inferred from the sensor 22 being inactive followed by activation. Activation may be required for a period of time to reduce the possibility of inadvertent activation from a passing object. Approach to the rear antenna 180 may be inferred from the antenna 180 failing to authenticate (as the fob 230 is out of range) followed by authentication at the rear antenna 180 within a relatively short time window allowing the user a reasonable period of time to move into range of the antenna 180 (keeping in mind that the user may be carrying an awkward load).

The detailed operation of an example hands-free operation system 10 may be further illustrated with the aid of a flowchart.

Figure 4:
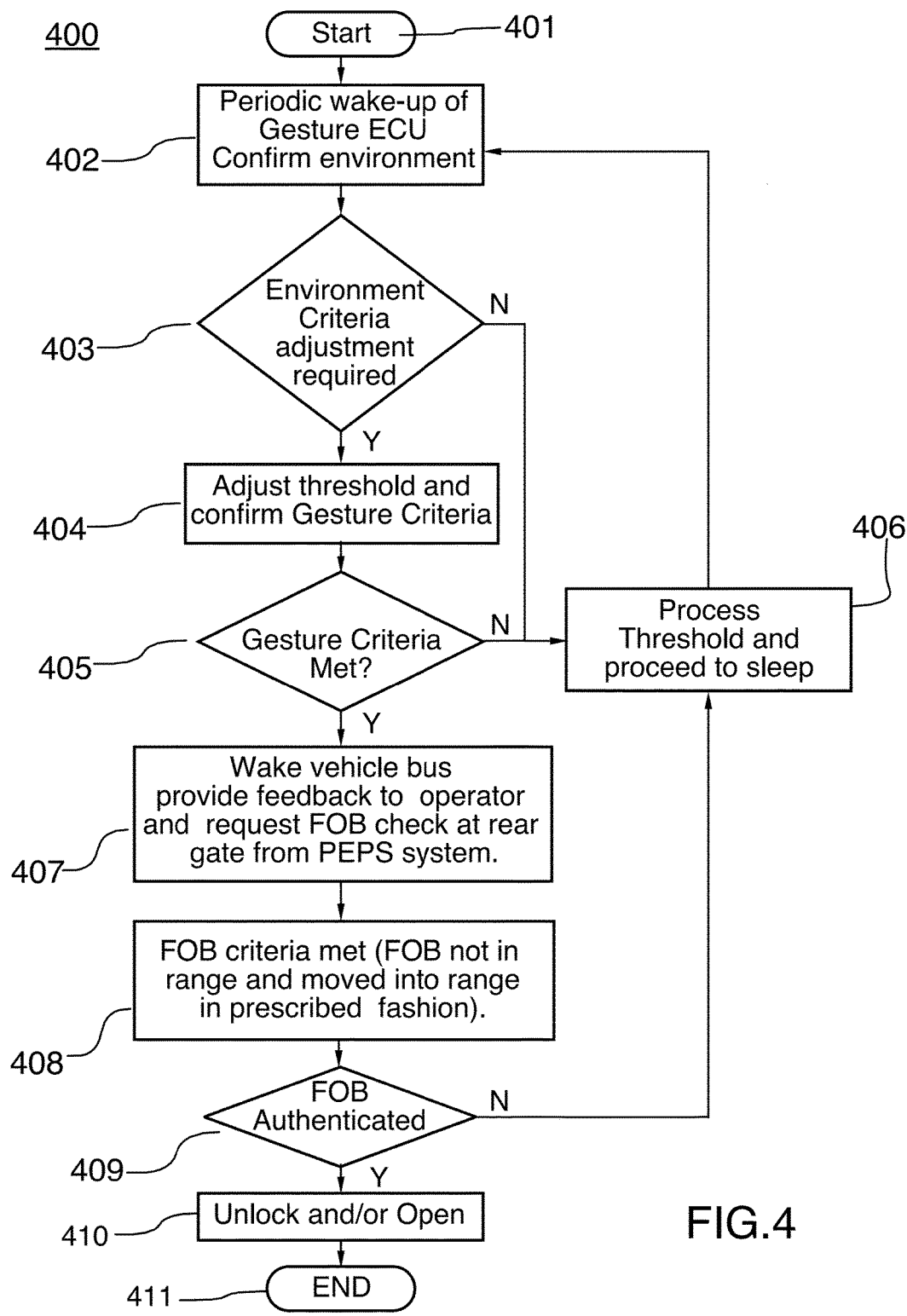
FIG. 4 is a flow chart illustrating operations of modules within a hands-free operation system for operating a liftgate of a vehicle, in accordance with an example embodiment of an aspect of the disclosure.

FIG. 4 is a flow chart illustrating operations 400 of modules (e.g., software or hardware modules 531, 521 within a controller 26) within a hands-free operation system 10 for operating a liftgate 12 of a vehicle 14, in accordance with an example embodiment of an aspect of the invention. The software or hardware modules 531, 521 may be located in the controller 26 or in a vehicle ECU, or distributed between the controller 26 and the vehicle ECU.

At step 401, the operations 400 start.

At step 402, the hands-free operation system 10 wakes up from a sleep mode and attempts to confirm its environment.

At step 403, a decision is made as to whether an environment criteria adjustment is required. For example, tests may be conducted to determine the difference in capacitance value of the sensor 22 when a user's foot is present as opposed to when a user's foot is not present. As another example, the capacitance value read from the sensor 22 may be adjusted based on environmental or weather conditions. In general, the system 10 may make adjustments in order to more accurately determine whether a user is present at the side 195 of the vehicle 14. To do this, adjustments to account for weather (e.g., rain, snow, humidity, heat, etc.), the presence of stationary objects (e.g., trees, poles, sign posts, etc.) at the side 195 of the vehicle 14, and other noise may be made by the system 10. According to one embodiment, two or more sensors 22 or sensors 22 of different types may be located in the wheel-well 150 to facilitate noise reduction adjustments. Two sensors 22 may also more accurately determine directions of motion to identify a gesture indicating intent to open the liftgate 12. If it is determined that an environmental criteria adjustment is required, operations continue to step 404. If it is determined that an environmental criteria adjustment is not required, operations continue to step 406.

At step 404, an environment criteria adjustment is made by the system 10. For example, a threshold level of the capacitance value of the sensor 22 may be adjusted. For adjustments relating to rain, according to one embodiment, the adjustment described in United States Patent Application Publication No. 2012/0192489 by Pribisic, published Aug. 2, 2012, and which is incorporated herein by reference, may be made. In addition, the system 10 confirms criteria that will be indicative of a user's intent to operate the liftgate 12 hands-free. As mentioned above, a user may show this intent by waving his or her foot in the volume 140. This intent is referred to herein as a "hands-free operation gesture" or simply "gesture". The detection of the presence of a tree, for example, by the system 10 would lack the necessary intent to be a hands-free operation gesture. The presence of a tree or other fixed object may be determined by storing the initial capacitance from the sensor 22 following placing the vehicle 14 in park, and using the initial sensed capacitance as a baseline for further comparisons until the vehicle 14 is moved again. Similarly, an object placed in the field of the proximity sensor 22 for a significant period of time that does not result in authentication at the rear antenna 180 within the specified time period after proximity activation may result in a change in the threshold trigger levels for the proximity sensor 22. This might be the case for rain, or for a person standing at the proximity sensor 22 not intending to authenticate.

At step 405, a decision is made as to whether the criteria for a hands-free operation gesture has been met. If it is determined that the criteria for a hands-free operation gesture has been met, operations continue to step 407. If it is determined that the criteria for a hands-free operation gesture has not been met, operations continue to step 406. As an alternative, a gesture may be replaced by recognition of an approach to the sensor 22 as discussed previously.

At step 406, any threshold adjustments made previously (e.g., at step 404) are processed, the system 10 enters a sleep mode, and operations return to step 402.

At step 407, the internal communications bus (not shown) of the vehicle 14 wakes up, an indication that the hands-free operation gesture has been received by the system 10 is optionally provided to the user and the system 10 requests a fob 230 check from the PEPS system 200 using the PEPS system's rear antenna 180 alone. Note that in the normal operation of a PEPS system 200, both the rear and front antennae 180, 170 or other antennas would be used to cover the area around the entire vehicle 14. According to one example embodiment, the system 10 controls one or more of the taillights 160 to flash to indicate that the hands-free operation gesture has been received by the system 10. According to another example embodiment, the system 10 controls one or more light emitting diodes ("LEDs") (not shown) mounted in the wheel-well 150 to indicate that the hands-free operation gesture has been received by the system 10, or an audible sound may be emitted, such as the beep often heard from an authentication system when providing feedback to a user.

At step 408, a check as to whether fob criteria is met is conducted by the system 10. According to one embodiment, the fob criteria includes, first, the fob 230 not being in range of the rear antenna 180 and, second, the fob 230 being moved into range of the rear antenna 180 in a prescribed fashion. According to one example embodiment, the prescribed fashion is within a predetermine time period. According to one example embodiment, the fob 230 must not be at the rear 190 of the vehicle 14 to begin with. Movement of the user from the side 195 of the vehicle 14 to the rear 190 of the vehicle 14 must occur.

At step 409, a decision is made as to whether the fob 230 has been authenticated by the system 10 (e.g., by the PEPS system 200 or by the RKE system 250). If it is determined that the fob 230 has been authenticated, operations continue to step 410. If it is determined that the fob 230 has not been authenticated, operations continue to step 406.

At step 410, the system 10 controls the latch 110 to open and the liftgate 12 to be raised. According to one embodiment, the operation of the liftgate 12 may be as described, for example, in the patent documents referenced earlier above or in United States Patent Application Publication No. US2008/0250720 A1 to Oxley et al, published Oct. 16, 2008, and which is incorporated herein by reference.

At step 411, the operations 400 end.

Figure 5:
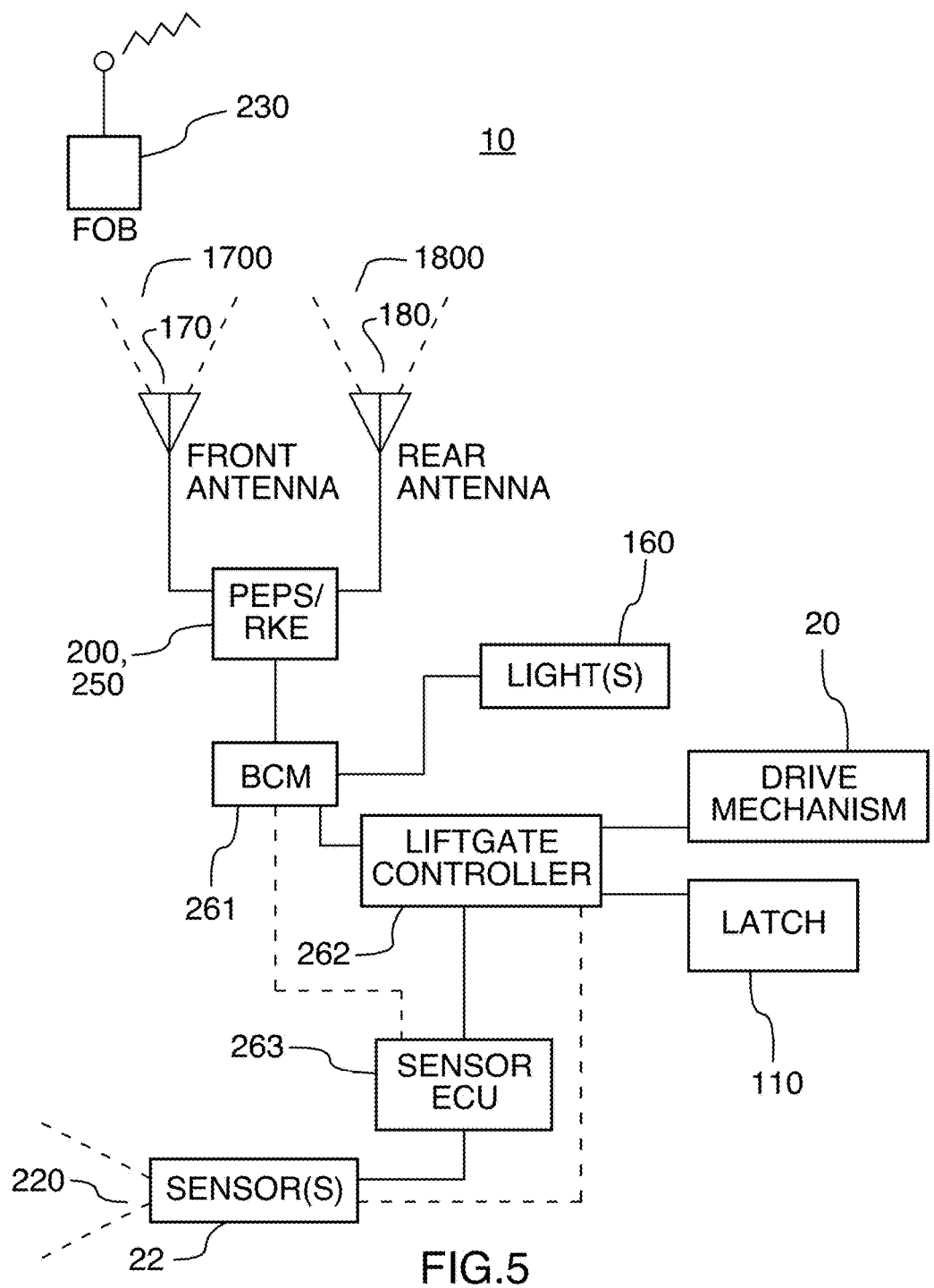
FIG. 5 is a block diagram illustrating a first alternate hands-free operation system for a liftgate of a vehicle in accordance with an example embodiment of an aspect of the disclosure.

FIG. 5 is a block diagram illustrating a first alternate hands-free operation system 10 for a liftgate 12 of a vehicle 14 in accordance with an example embodiment of an aspect of the disclosure. In FIG. 5, rather than having a single controller 26, the system 10 has separate controllers 261, 262, 263 which are used to implement different functions of the system 10. In particular, a combined PEPS/RKE system 200, 250 is used which is in communication with the front and rear antennae 170, 180 and which is coupled to a general or body control module ("BCM") 261. The BCM 261 is coupled to a liftgate controller 262 which controls the drive mechanism 20 and latch 110. A sensor electronic control unit ("ECU") 263 monitors one or more sensors 22 and is in communication with the liftgate controller 262. According to one embodiment, the sensor(s) are coupled directly to the BCM 261. According to another embodiment, the sensor(s) 22 are coupled directly to the liftgate controller 262.

Figure 6:
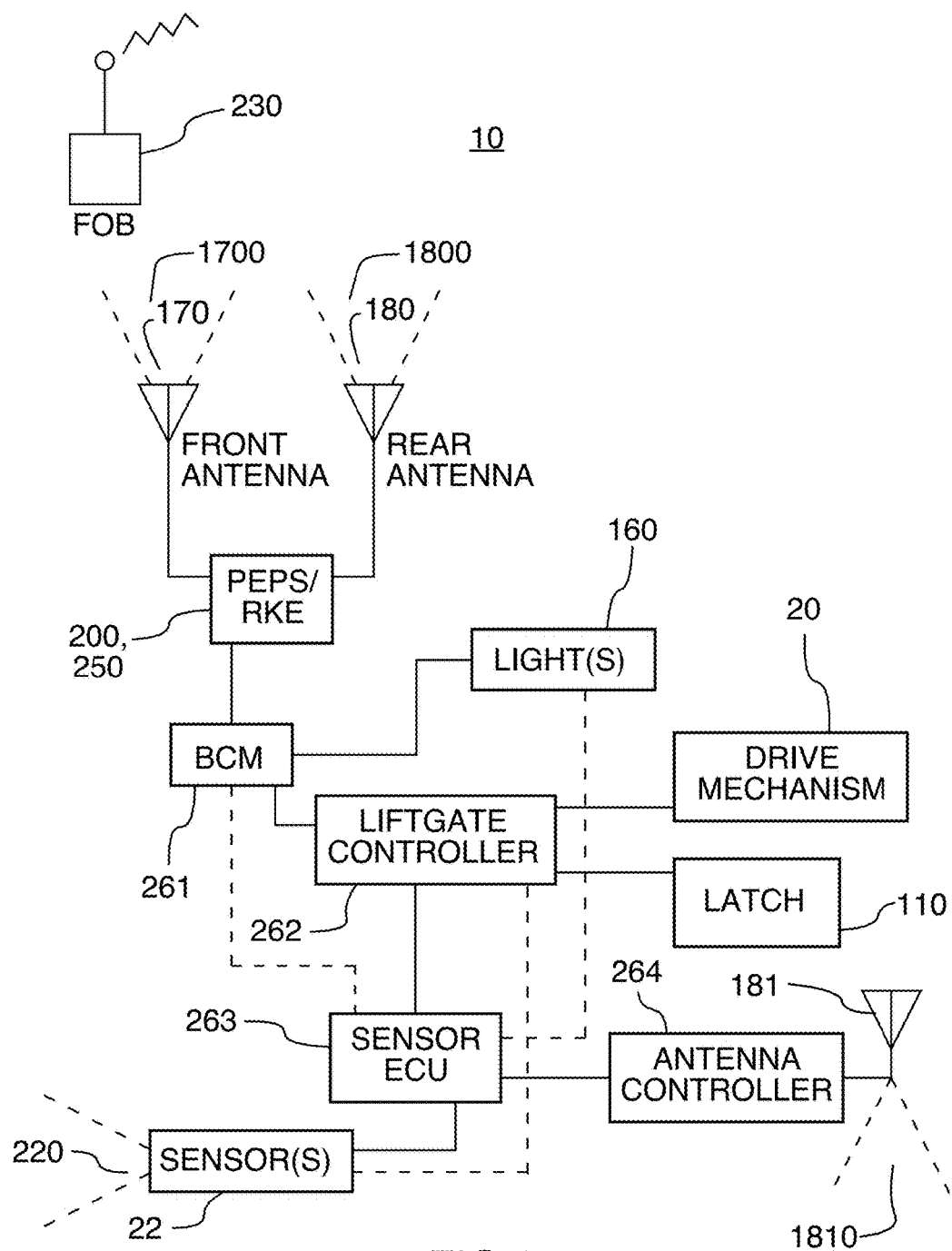
FIG. 6 is a block diagram illustrating a second alternate hands-free operation system for a liftgate of a vehicle in accordance with an example embodiment of an aspect of the disclosure.

FIG. 6 is a block diagram illustrating a second alternate hands-free operation system 10 for a liftgate 12 of a vehicle 14 in accordance with an example embodiment of an aspect of the disclosure. In FIG. 6, in addition to the components described above with respect to FIG. 5, the system 10 includes a hands-free operation antenna controller 264 operatively coupled to the sensor ECU 263. The antenna controller 264 is for communicating hands-free operation related signals to and from a dedicated rear-mounted hands-free operation antenna 181. Transmissions from the dedicated antenna 181 may be directed to a narrower or different authentication range 1810 at the rear 190 of the vehicle 14 than the authentication range 1800 covered by the PEPS/RKE system's rear antenna 180. By using the separate antenna controller 264 and antenna 181, no changes need be made to the vehicle's existing PEPS/RKE system 200, 250. In operation, the antenna controller 264 broadcasts a low frequency, short range beacon signal via its associated antenna 181. When a fob 230 detects the beacon signal, it may begin communicating with and issuing commands to the existing PEPS/RKE system 200, 250 to carry out hands-free operation of the liftgate 12. The antenna controller 264 may be operatively coupled directly to the vehicle's lights 160 for user signalling purposes.

Figure 7:
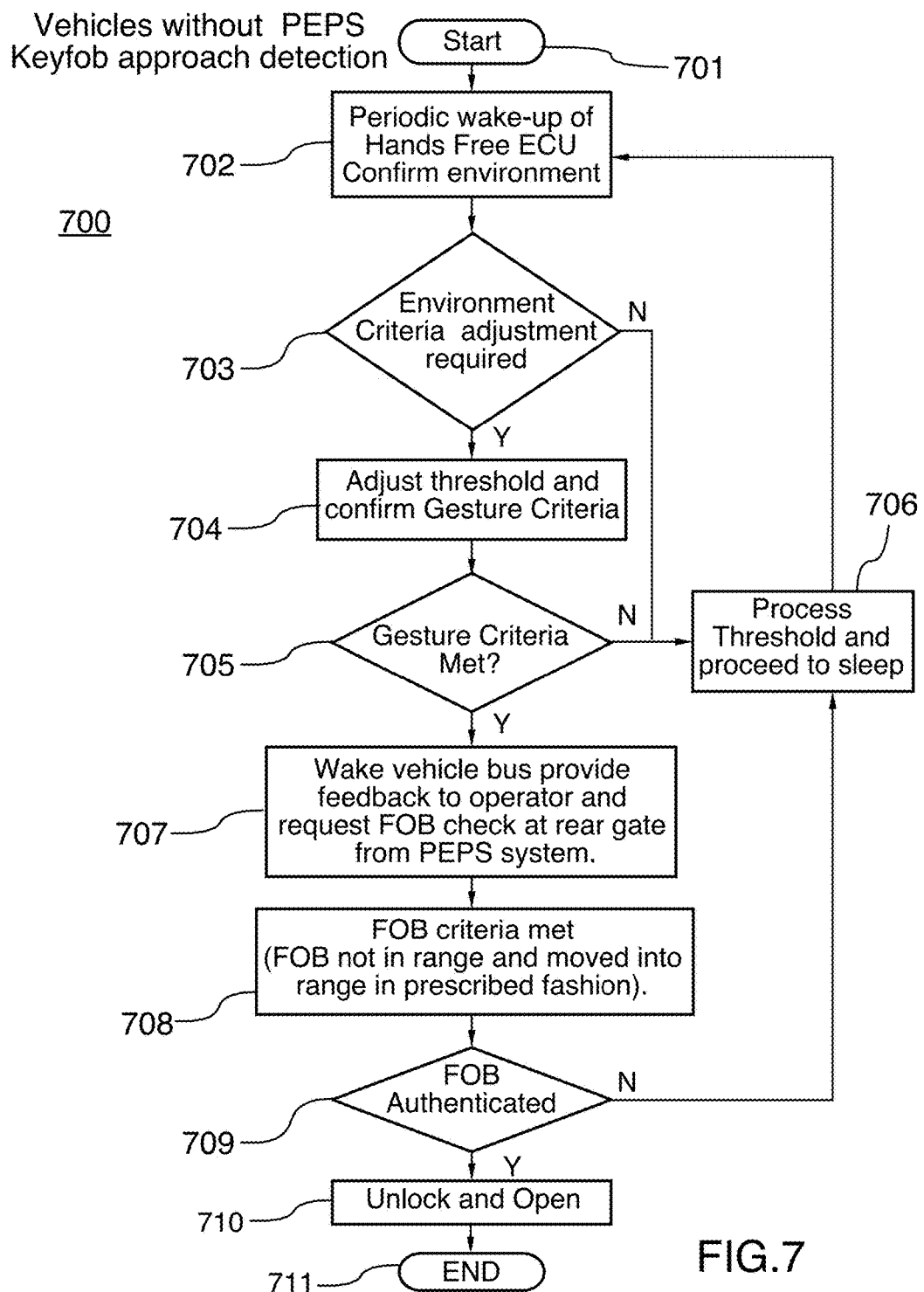
FIG. 7 is a flow chart illustrating operations of modules within a hands-free or motion activated operation system for operating a liftgate of a vehicle, in accordance with an example embodiment of an aspect of the disclosure.

FIG. 7 is a flow chart illustrating operations 700 of modules (e.g., software or hardware modules 531, 521 within a controller 26) within a hands-free or motion activated operation system 10 for operating a liftgate 12 of a vehicle 14, in accordance with an example embodiment of an aspect of the disclosure. According to one example embodiment, the operations 700 illustrated in FIG. 7 may be used in vehicles that do not implement PEPS fob approach detection. The steps 701-711 shown in FIG. 7 are similar to the respective steps 401-411 described above with respect to FIG. 4, except, at step 702, the term "hands-free ECU" is used denoting a hands-free or motion activated operation system 10. In addition, locations for sensors 22 may include the bumper 120, taillights 160, and in or behind the rear quarter glass or panel 165 as described below.

Figure 8:
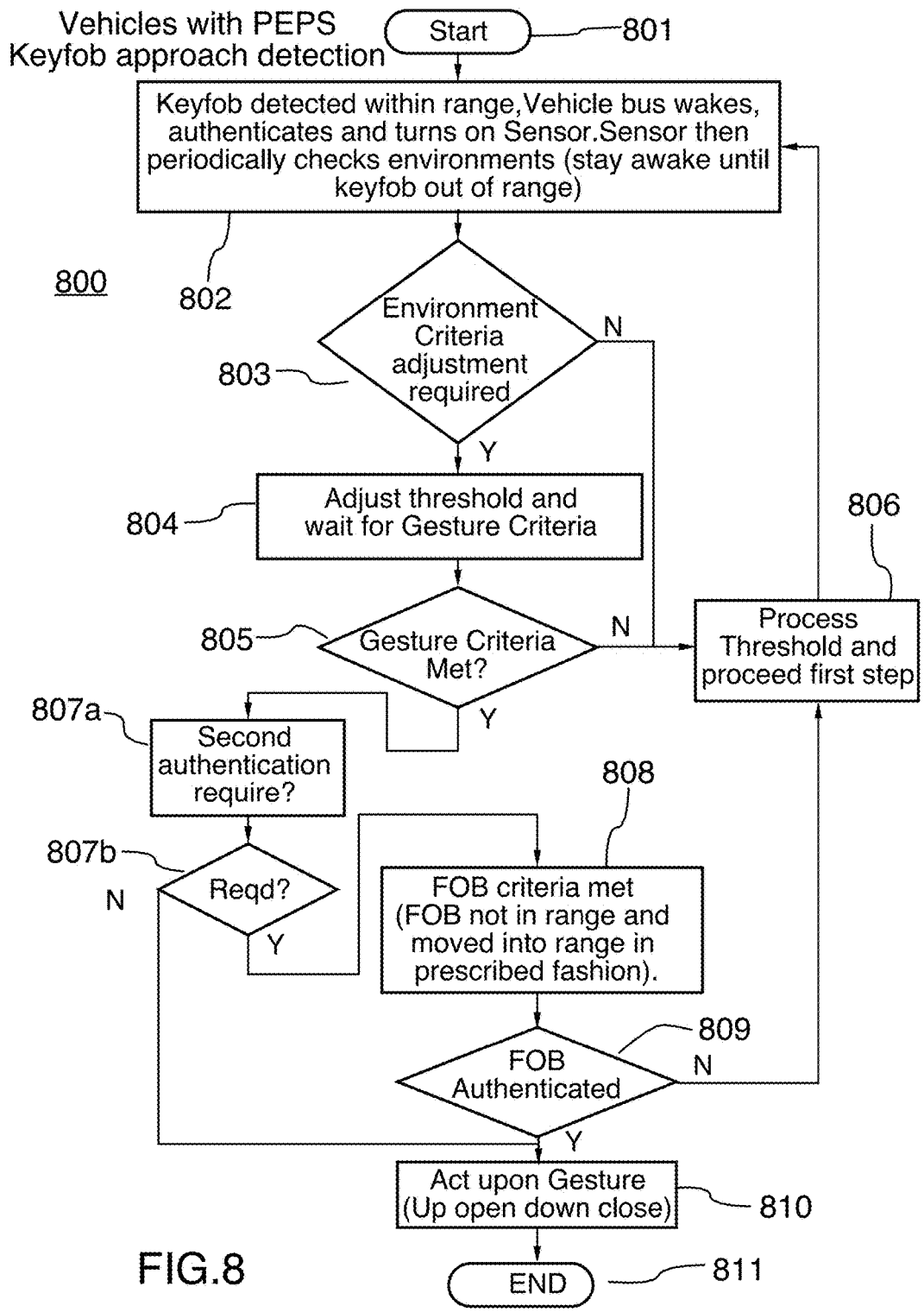
FIG. 8 is a flow chart illustrating alternate operations of modules within a hands-free or motion activated operation system for operating a liftgate of a vehicle, in accordance with an example embodiment of an aspect of the disclosure.

FIG. 8 is a flow chart illustrating alternate operations 800 of modules (e.g., software or hardware modules 531, 521 within a controller 26) within a hands-free or motion activated operation system 10 for operating a liftgate 12 of a vehicle 14, in accordance with an example embodiment of an aspect of the disclosure. According to one example embodiment, the operations 800 illustrated in FIG. 8 may be used in vehicles that implement PEPS fob approach detection. Locations for sensors 22 may include the bumper 120, taillight 160, and in or behind the rear quarter glass or panel 165.

At step 801, the operations 800 start.

At step 802, a fob 230 is detected within a predetermined range or distance from the vehicle 14 by the PEPS system 200. The vehicle's internal communications bus (not shown) wakes up, the PEPS system 200 authenticates the fob 230, and the hands-free or motion activated operation system 10 is activated. The system 10 attempts to confirm its environment and stays awake until the fob 230 is out of range. According to one example embodiment, the system 10 controls a green light emitting diode ("LED") (not shown) mounted in or behind the rear quarter glass 165 (or in or on the taillight 160 or bumper 120) to indicate that the PEPS system 200 is active.

At step 803, a decision is made as to whether an environment criteria adjustment is required. For example, tests may be conducted to determine the difference in capacitance value of the sensor 22 when a user's hand or foot is present as opposed to when a user's hand or foot is not present. As another example, the capacitance value read from the sensor 22 may be adjusted based on environmental or weather conditions. In general, the system 10 may make adjustments in order to more accurately determine whether a user is present at the side 195 of the vehicle 14. To do this, adjustments to account for weather (e.g., rain, snow, humidity, heat, etc.), the presence of stationary objects (e.g., trees, poles, sign posts, etc.) at the side 195 of the vehicle 14, and other noise may be made by the system 10. According to one example embodiment, which is further described below, two or more spaced apart sensors 22 located in or under the rear quarter glass or panel 165, for example, may be used to more accurately determine directions of motion to identify gestures indicating intent to open or close the liftgate 12. Example use of multiple sensors 22 for opening and closing vehicle panels is described in U.S. Patent Application No. 61/844,533 by Kalliomaki et al., filed Jul. 10, 2013, the entire content of which is hereby incorporated by reference. According to another example embodiment, two or more sensors 22 or sensors 22 of different types may be used to facilitate noise reduction adjustments. If it is determined that an environmental criteria adjustment is required, operations continue to step 804. If it is determined that an environmental criteria adjustment is not required, operations continue to step 806.

At step 804, an environment criteria adjustment is made by the system 10. For example, a threshold level of the capacitance value of the sensor 22 may be adjusted. For adjustments relating to rain, according to one embodiment, the adjustment described in United States Patent Application Publication No. 2012/0192489 by Pribisic, published Aug. 2, 2012, and which is incorporated herein by reference, may be made. In addition, the system 10 confirms criteria that will be indicative of a user's intent to operate the liftgate 12 hands-free. As mentioned above, a user may show this intent by waving his or her foot in the volume 140. Alternatively, a user may show this intent by waving his or her hand, arm, or shoulder adjacent the rear quarter glass 165 of the vehicle 14. This intent is referred to herein as a "hands-free operation gesture" or simply "gesture". The detection of the presence of a tree, for example, by the system 10 would lack the necessary intent to be a hands-free operation gesture. The presence of a tree or other fixed object may be determined by storing the initial capacitance from the sensor 22 following placing the vehicle 14 in park, and using the initial sensed capacitance as a baseline for further comparisons until the vehicle 14 is moved again. Similarly, an object placed in the field of the proximity sensor 22 for a significant period of time that does not result in authentication at the rear antenna 180 within the specified time period after proximity activation may result in a change in the threshold trigger levels for the proximity sensor 22. This might be the case for rain, or for a person standing at the proximity sensor 22 not intending to authenticate.

At step 805, a decision is made as to whether the criteria for a hands-free operation gesture has been met. If it is determined that the criteria for a hands-free operation gesture has been met, operations continue to step 807*a*. An indication that the hands-free operation gesture has been received by the system 10 is optionally provided to the user. According to one example embodiment, the system 10 controls one or more red light emitting diodes ("LEDs") (not shown) mounted in or behind the rear quarter glass 165 (or in or on the taillight 160 or bumper 120) to indicate that the hands-free operation gesture has been received by the system 10. According to another example embodiment, the system 10 controls one or more of the taillights 160 to flash to indicate that the hands-free operation gesture has been received by the system 10. According to yet another example embodiment, the system 10 controls the emission of an audible sound, such as the beep often heard from an authentication system when providing feedback to a user, to indicate that the hands-free operation gesture has been received by the system 10. If it is determined that the criteria for a hands-free operation gesture has not been met, operations continue to step 806. As an alternative, a gesture may be replaced by recognition of an approach to the sensor 22 as discussed previously.

At step 806, any threshold adjustments made previously (e.g., at step 804) are processed, the system 10 may enter a sleep mode, and operations return to step 802.

At step 807a, a determination is made as to whether a second PEPS system authentication is required and operations proceed to step 807b.

At step 807b, if it is determined that a second PEPS authentication is required, operations continue to step 808. If it is determined that a second PEPS authentication is not required, operations continue to step 810.

At step 808, the system 10 requests a second fob 230 check from the PEPS system 200 using the PEPS system's rear antenna 180 alone. Note that in the normal operation of a PEPS system 200, both the rear and front antennae 180, 170 or other antennas would be used to cover the area around the entire vehicle 14. In addition, a check as to whether fob criteria is met is conducted by the system 10. According to one embodiment, the fob criteria includes, first, the fob 230 not being in range of the rear antenna 180 and, second, the fob 230 being moved into range of the rear antenna 180 in a prescribed fashion. According to one example embodiment, the prescribed fashion is within a predetermine time period. According to one example embodiment, the fob 230 must not be at the rear 190 of the vehicle 14 to begin with. Movement of the user from the side 195 of the vehicle 14 to the rear 190 of the vehicle 14 must occur.

At step 809, a decision is made as to whether the fob 230 has been authenticated by the system 10 (e.g., by the PEPS system 200 or by the RKE system 250). If it is determined that the fob 230 has been authenticated, operations continue to step 810. If it is determined that the fob 230 has not been authenticated, operations continue to step 806.

At step 810, the system 10 controls the latch 110 to open and the liftgate 12 to be raised. The system 10 may also control the liftgate 12 to be lowered and closed by the latch 110. According to one embodiment, the operation of the liftgate 12 may be as described, for example, in the patent documents referenced earlier above or in United States Patent Application Publication No. US2008/0250720 A1 to Oxley et al, published Oct. 16, 2008, and which is incorporated herein by reference.

At step 811, the operations 800 end.

According to the example embodiments of FIGS. 7 and 8, the sensors 22 may be installed in or behind the rear quarter glass or panel 165, taillights 160, or bumper 120 of the vehicle 14. The embodiment of FIG. 7 may be used in vehicles having PEPS systems without approach detection/authentication. In this case, the embodiment of FIG. 7 operates similarly to the embodiment of FIG. 4. In contrast, the embodiment of FIG. 8 may be used in vehicles having PEPS systems with approach detection/authentication. In this case, the system 10 does not require a deep sleep polling strategy. The system 10 is active upon approach by a user with a fob 230. The option to re-authenticate the fob 230 upon activation is still available, as described above, to insure that the user and fob 230 are within range of the liftgate 12. According to one example embodiment, the PEPS system 200 is an aftermarket PEPS system. The PEPS system 200 is used to detect approach and has an extended range (e.g., around 5-6 meters hence the ability of a user with fob 230 to approach from the side 195 of the vehicle 14). Again, the PEPS system 200 turns on the system 10 and the second optional authentication occurs at the rear 190 of the vehicle 14.

Figure 9:
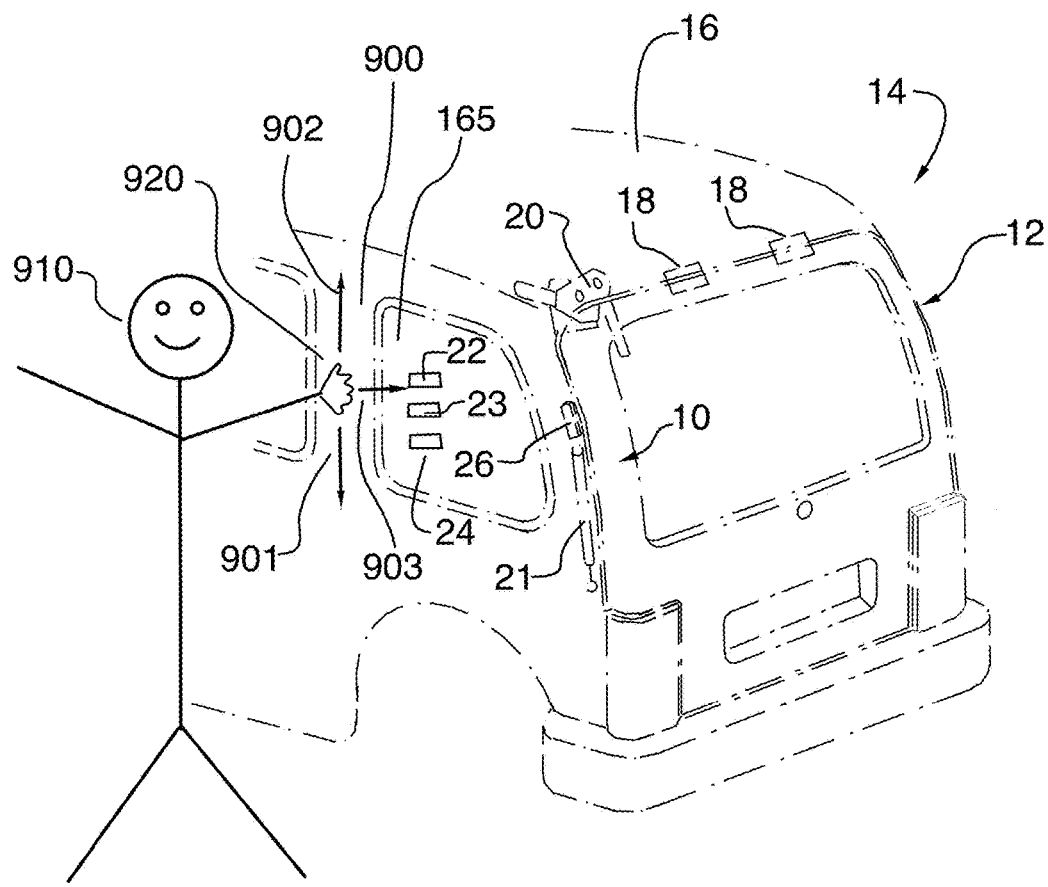
FIG. 9 is rear perspective view illustrating a hands-free operation system for a liftgate of a vehicle having multiple body-mounted sensors in accordance with an example embodiment of an aspect of the disclosure.
Figure 10:
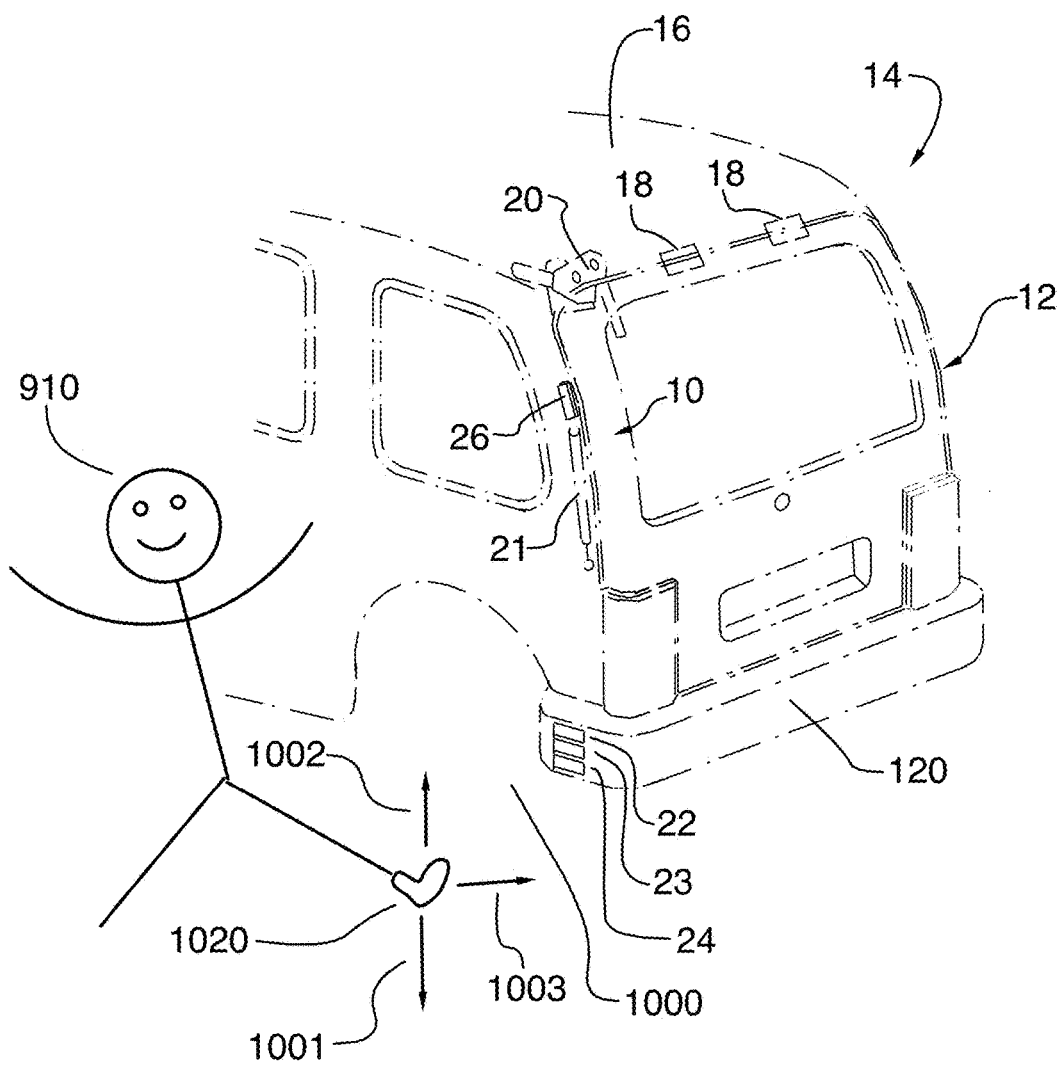
FIG. 10 is rear perspective view illustrating a hands-free operation system for a liftgate of a vehicle having multiple bumper-mounted sensors in accordance with an example embodiment of an aspect of the disclosure.

FIG. 9 is rear perspective view illustrating a hands-free operation system 10 for a liftgate 12 of a vehicle 14 having multiple body-mounted sensors 22, 23, 24 in accordance with an example embodiment of an aspect of the disclosure. And, FIG. 10 is rear perspective view illustrating a hands-free operation system 10 for a liftgate 12 of a vehicle 14 having multiple bumper-mounted sensors 22, 23, 24 in accordance with an example embodiment of an aspect of the disclosure. As mentioned above, according to one example embodiment, two or more spaced apart sensors 22, 23, 24 may be used to more accurately determine directions of motion to identify gestures indicating intent to open or close the liftgate 12. Each sensor 22, 23, 24 may be a capacitive proximity sensor 22 as described above and shown in FIG. 3. In FIG. 9, the two or more spaced apart sensors 22, 23, 24 are located on the body 16 of the vehicle 14, for example, in or under the rear quarter glass or panel 165, and are activated by the motion of a user's hand 920. In FIG. 10, the two or more spaced apart sensors 22, 23, 24 are located on the bumper 120 of the vehicle 14, for example, at one end or at each end of the bumper 120 under the bumper skin or fascia, and are activated by the motion of a user's foot 1020.

Referring to FIG. 9, in operation, when a user 910 moves his or her hand 920 in the volume 900 proximate to the sensors 22, 23, 24, the sensors 22, 23, 24 are sequentially activated. The activation of the sensors 22, 23, 24 is detected by the controller 26 which operates the latch 110 and drive mechanism 20 to move the liftgate 12 to its open, partially open, or closed positions in accordance with the user's hand movement. In particular, the user 910 may make an upward hand wave motion or gesture 902 to generate a command to move the liftgate 12 up, the user 910 may make a downward hand wave motion or gesture 901 to generate a command to move the liftgate 12 down, and the user 910 may make an inward hand motion or gesture 903 (i.e., toward closer proximity to the sensors 22, 23, 24) while the liftgate 12 is in motion to generate a command to stop movement of the liftgate 12.

Referring to FIG. 10, in operation, when a user moves his or her foot 1020 in the volume 1000 proximate to the sensors 22, 23, 24, the sensors 22, 23, 24 are sequentially activated. The activation of the sensors 22, 23, 24 is detected by the controller 26 which operates the latch 110 and drive mechanism 20 to move the liftgate 12 to its open, partially open, or closed positions in accordance with the user's foot movement. In particular, the user 910 may make an upward foot wave motion or gesture 1002 to generate a command to move the liftgate 12 up, the user 910 may make a downward foot wave motion or gesture 1001 to generate a command to move the liftgate 12 down, and the user 910 may make an inward foot motion or gesture 1003 (i.e., toward closer proximity to the sensors 22, 23, 24) while liftgate 12 is in motion to generate a command to stop movement of the liftgate 12.

In FIGS. 9 and 10, user hand or foot gesture sensing is performed using two or more sensors 22, 23, 24 and the controller 26. The motion of a user's hand 920 or foot 1020 is detected by the controller 26 which monitors respective signals from the sensors 22, 23, 24 which are spaced (e.g., vertically) appropriate distances apart along the rear quarter glass or panel 165 or bumper 120 to maximize signal differentiation between them.

Figure 11:
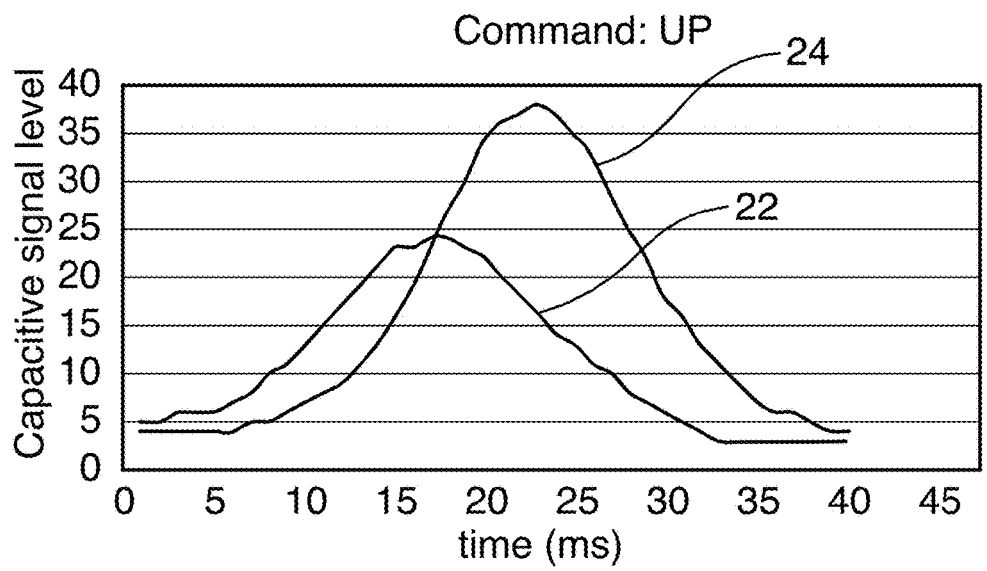
FIG. 11 is a graph illustrating capacitive signal level versus time for an "Up" hand or foot gesture in accordance with an example embodiment of an aspect of the disclosure.
Figure 12:
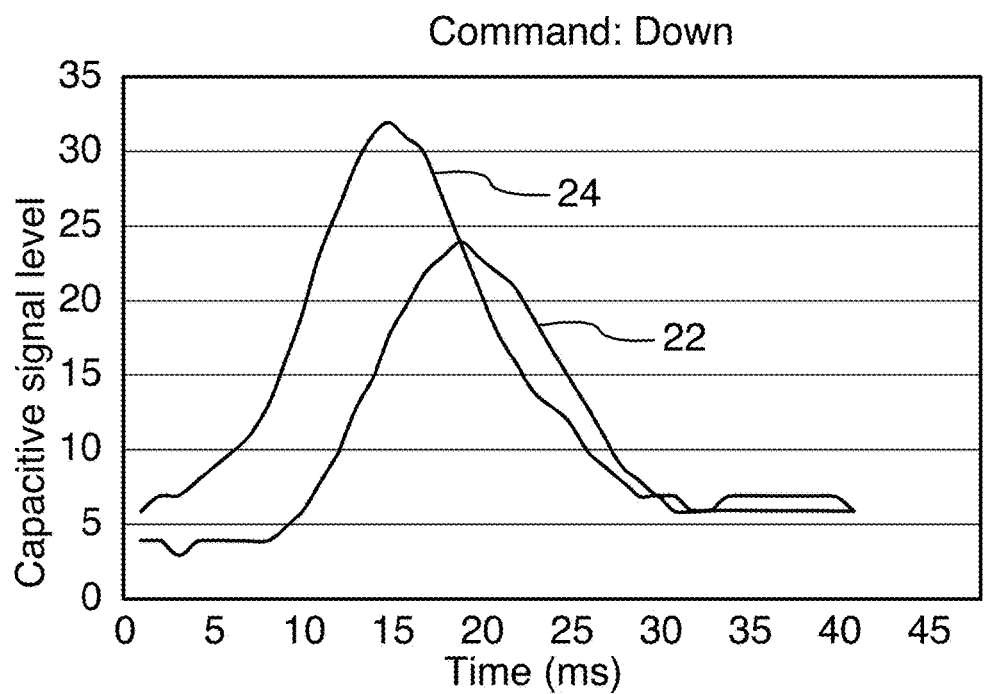
FIG. 12 is a graph illustrating capacitive signal level versus time for a "Down" hand or foot gesture in accordance with an example embodiment of an aspect of the disclosure.
Figure 13:
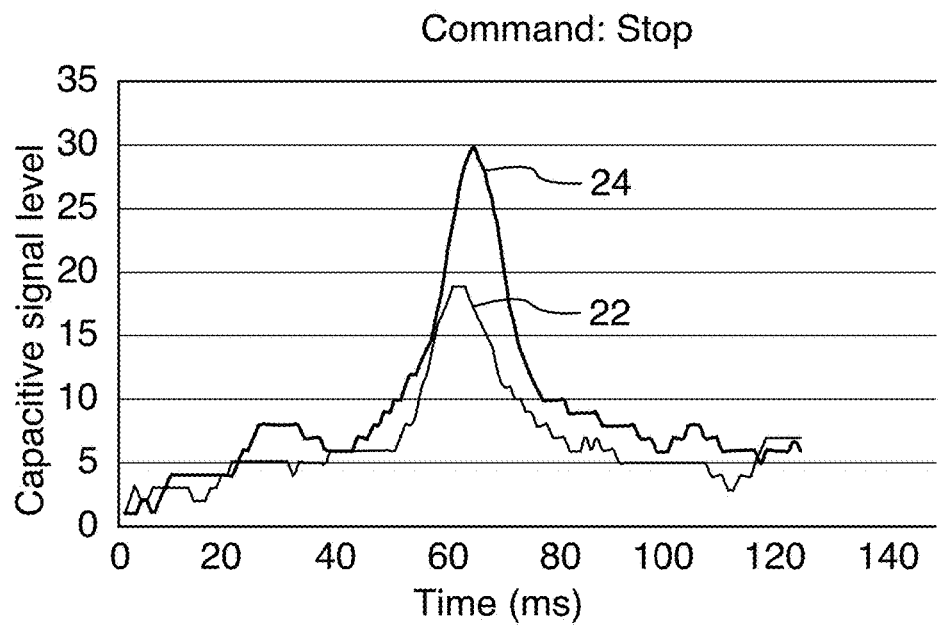
FIG. 13 is a graph illustrating capacitive signal level versus time for a "Stop" hand or foot gesture in accordance with an example embodiment of an aspect of the disclosure.

FIG. 11 is a graph illustrating capacitive signal level versus time for an "Up" hand or foot gesture 902, 1002 in accordance with an example embodiment of an aspect of the disclosure. FIG. 12 is a graph illustrating capacitive signal level versus time for a "Down" hand or foot gesture 901, 1001 in accordance with an example embodiment of an aspect of the disclosure. And, FIG. 13 is a graph illustrating capacitive signal level versus time for a "Stop" hand or foot gesture 903, 1003 in accordance with an example embodiment of an aspect of the disclosure.

Referring to FIG. 11, detecting a capacitive signal peak from the lower sensor 24 followed by a capacitive signal peak from the upper sensor 22 may be interpreted as a liftgate "Up" hand or foot gesture 902, 1002. Referring to FIG. 12, detecting a capacitive signal peak from the upper sensor 22 followed by a capacitive signal peak from the lower sensor 24 may be interpreted as a liftgate "Down" hand or foot gesture 901, 1001. Referring to FIG. 13, if no time delay between capacitive signal peaks is detected, or if capacitive signal peaks overlap, or if a capacitive signal magnitude change is detected during liftgate motion, such may be interpreted as a liftgate "Stop" hand or foot gesture 903, 1003.

Figure 14:
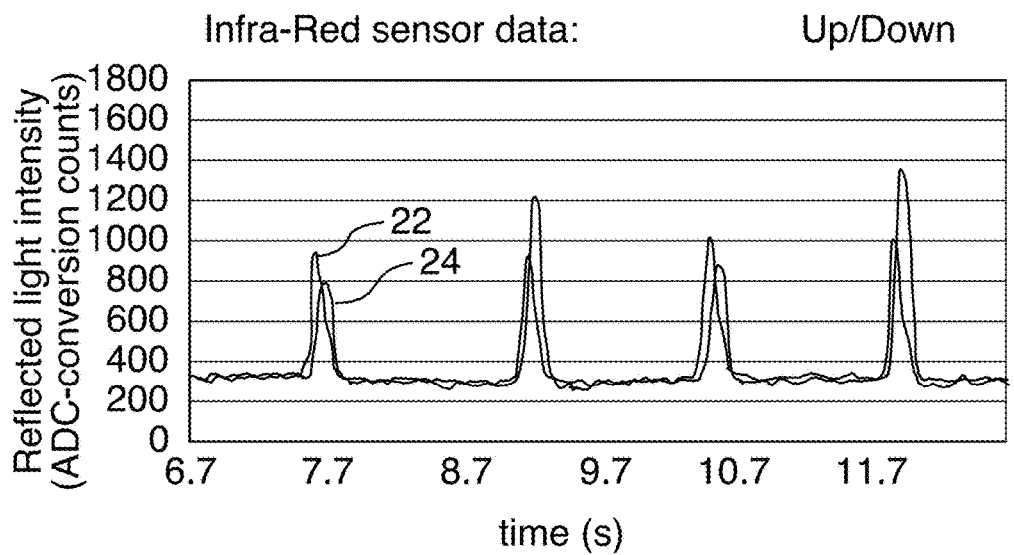
FIG. 14 is a graph illustrating reflected infrared light intensity versus time for "Up" and "Down" hand or foot gestures in accordance with an example embodiment of an aspect of the disclosure.

FIG. 14 is a graph illustrating reflected infrared light intensity versus time for "Up" and "Down" hand or foot gestures 902, 901, 1002, 1001 in accordance with an example embodiment of an aspect of the disclosure. According to one example embodiment, rather than using two or more capacitive sensors 22, 23, 24, the system 10 uses two or more infrared sensors 22, 23, 24. In particular, for infrared gesture sensing, two or more infrared ("IR") emitters (e.g., IR light emitting diodes ("LEDs")) 22, 24 and an infrared sensor 23 may be used.

According to this example embodiment, reflected infrared light from individual emitters 22, 24 is captured by the infrared sensor 23 and measured periodically under software control by the controller 26. The infrared sensor 23 captures higher intensity reflected light from an IR emitter 22, 24 when an object is proximate than when the object is further away. As a result, time shifted signals from multiple emitters may be observed when a user moves his or her hand 920 or foot 1020 sequentially over the emitters. For reliable gesture detection, the infrared emitters and sensors 22, 23, 24 should be spaced apart appropriately as shown, for example, in FIGS. 9 and 10.

User hand and foot gestures 902, 901, 1002, 1001 are detected by observing two or more reflected light signals at the infrared sensor 23 from the infrared emitters 22, 24, which are spaced by an appropriate distance to maximize signal differentiation. Detecting a reflected light signal peak from the lower infrared emitter 24 followed by a reflected light signal peak from the upper infrared emitter 22 may be interpreted as a liftgate "Up" hand or foot gesture 902, 1002. Detecting a reflected light signal peak from the upper infrared emitter 22 followed by a reflected light signal peak from the lower infrared emitter 24 may be interpreted as a liftgate "Down" hand or foot gesture 901, 1001. If no time delay between reflected light signal peaks is detected, or if reflected light signal peaks overlap, or if a reflected light signal magnitude change is detected during liftgate motion, such may be interpreted as a liftgate "Stop" hand or foot gesture 903, 1003. According to one example embodiment, in order to avoid false activation of the sensors 22, 23, 24, the sensitivities of the sensors 22, 23, 24 and/or controller 26 may be adjusted. According to another example embodiment, the location of the sensors 22, 23, 24 may be selected to avoid or reduce false activation.

Figure 15:
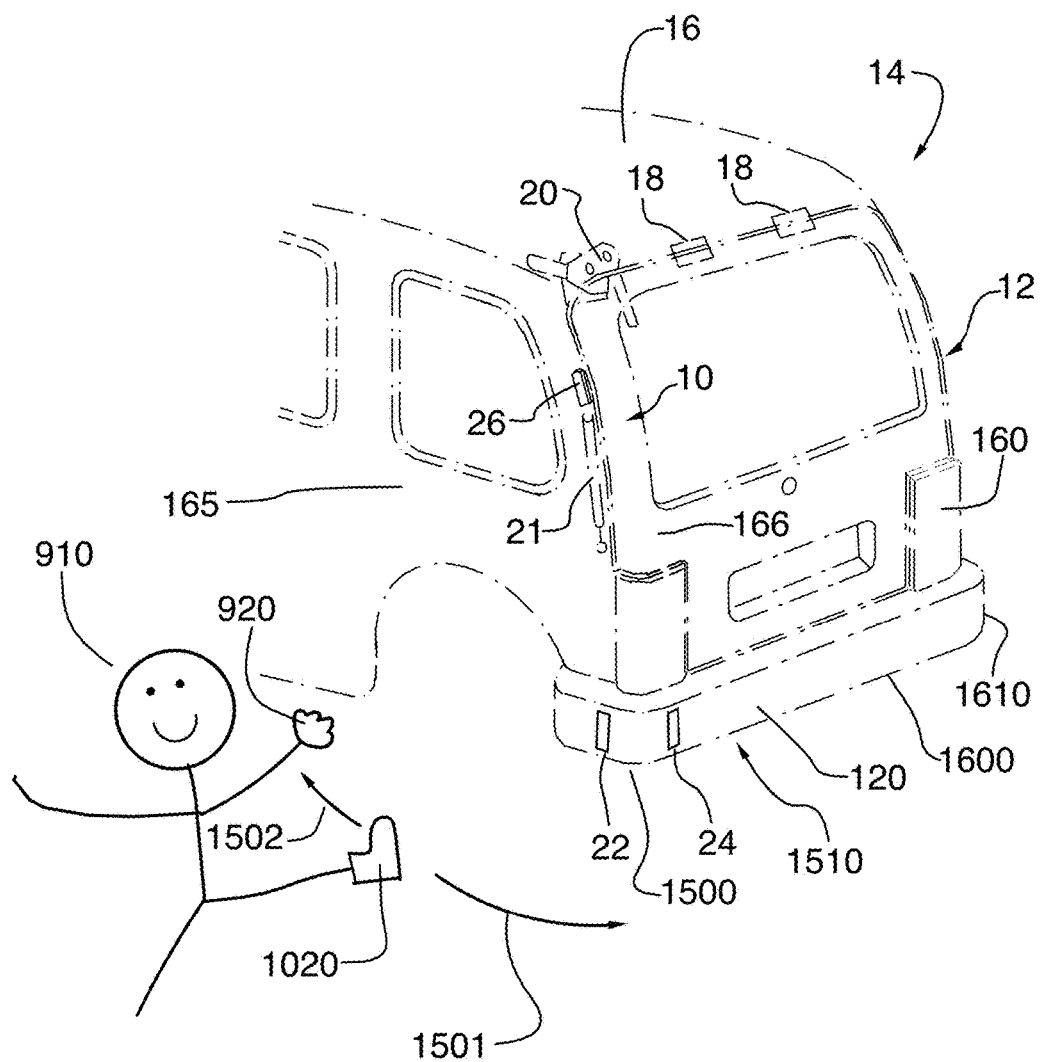
FIG. 15 is rear perspective view illustrating a hands-free operation system for a liftgate of a vehicle having multiple vertically oriented sensors in accordance with an example embodiment of an aspect of the disclosure.
Figure 16:
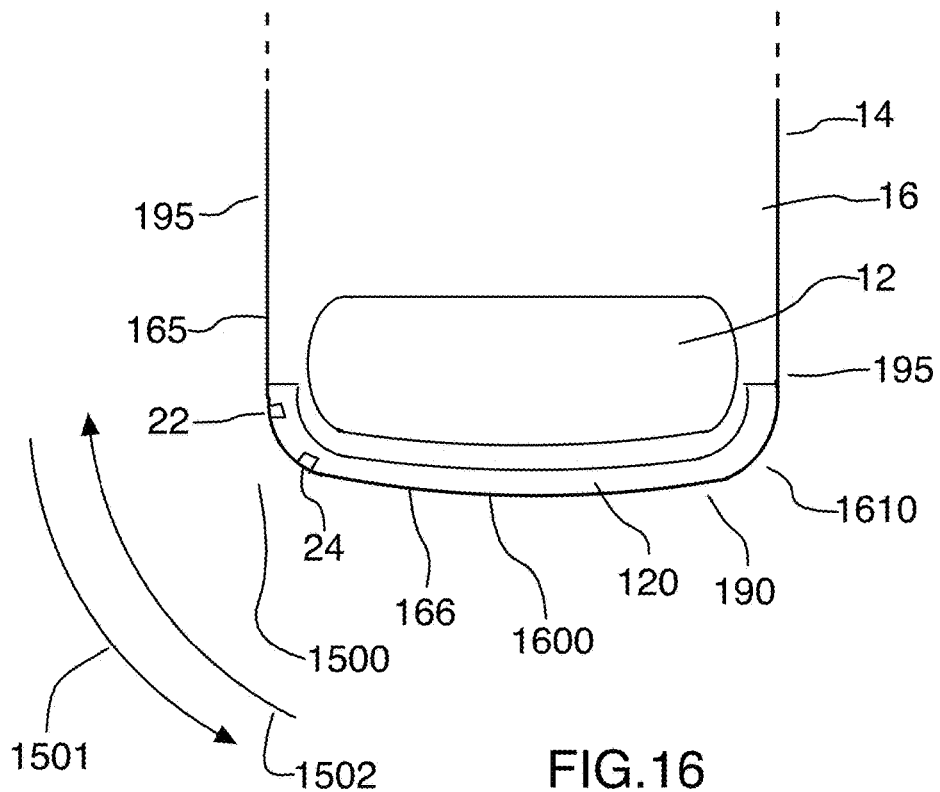
FIG. 16 is top view illustrating the hands-free operation system of FIG. 15 in accordance with an example embodiment of an aspect of the disclosure.

FIG. 15 is rear perspective view illustrating a hands-free operation system 10 for a liftgate 12 of a vehicle 14 having multiple vertically oriented sensors 22, 24 in accordance with an example embodiment of an aspect of the disclosure. And, FIG. 16 is top view illustrating the hands-free operation system 10 of FIG. 15 in accordance with an example embodiment of an aspect of the disclosure. As mentioned above, according to one example embodiment, two or more spaced apart sensors 22, 24 may be used to more accurately determine directions of motion to identify gestures indicating intent to open or close the liftgate 12. Each sensor 22, 24 may be a capacitive proximity sensor 22 as described above and shown in FIG. 3. In FIGS. 15 and 16, the two or more spaced apart sensors 22, 24 are vertically oriented. In addition, the two or more sensors 22, 24 are spaced apart along the periphery 1600 of the vehicle 14. The two or more sensors 22, 24 may be spaced along the periphery 1600 of the vehicle 14 at or on either side of the transition 1610 between or corner 1610 formed by side panels 165 and rear panels 166 of the vehicle 14. The two or more spaced apart sensors 22, 24 may be located in, on, or behind the bumper 120 of the vehicle 14, for example, at one end or at each end of the bumper 120 under the bumper skin or fascia and may be activated by the motion of a user's foot 1020. Alternatively, the two or more spaced apart sensors 22, 24 may be located in, on, or behind a taillight 160 of the vehicle 14 and may be activated by the motion of a user's hand 920 or foot 1020. Alternatively, the two or more spaced apart sensors 22, 24 may be located on the body 16 of the vehicle 14, for example, on, in, or under the rear quarter glass or panel 165 and/or rear glass or panel 166 and may be activated by the motion of a user's hand 920.

Advantageously, the use of vertically oriented sensors 22, 24 helps reduce the occurrence of false sequential sensor activations caused by water running down the exterior surfaces of the vehicle 14.

Referring to FIGS. 15 and 16, in operation, when a user 910 moves his or her hand 920 or foot 1020 in the volume 1500 proximate to the sensors 22, 24, the sensors 22, 24 are sequentially activated. The activation of the sensors 22, 24 is detected by the controller 26 which operates the latch 110 and drive mechanism 20 to move the liftgate 12 to its open, partially open, or closed positions in accordance with the user's hand or foot movement. In particular, the user 910 may make an forward directed (e.g., to a first side, horizontally or approximately horizontally, across, etc.) hand or foot wave motion or gesture 1502 to generate a command to move the liftgate 12 up; and, the user 910 may make a rearward directed (e.g., to a second side, horizontally or approximately horizontally, across, etc.) hand or foot wave motion or gesture 1501 to generate a command to move the liftgate 12 down. In addition, the user 910 may make an inward directed hand or foot motion or gesture (i.e., toward closer proximity to the sensors 22, 24) while the liftgate 12 is in motion to generate a command to stop movement of the liftgate 12.

In FIGS. 15 and 16, user hand or foot gesture sensing is performed using two or more sensors 22, 24 and the controller 26. The motion of a user's hand 920 or foot 1020 is detected by the controller 26 which monitors respective signals from the sensors 22, 24 which are spaced (e.g., horizontally or approximately horizontally) appropriate distances apart along the periphery 1600 of the vehicle 14 in, on, or behind the bumper 120, taillight 160, or panels 165, 166 to maximize signal differentiation between them.

According to one example embodiment, the gestures (e.g., 1501, 1502, etc.) described herein may be made with a user's hand 920, foot 1020, arm, leg, limb, body or part thereof, or a combination of these.

Figure 17:
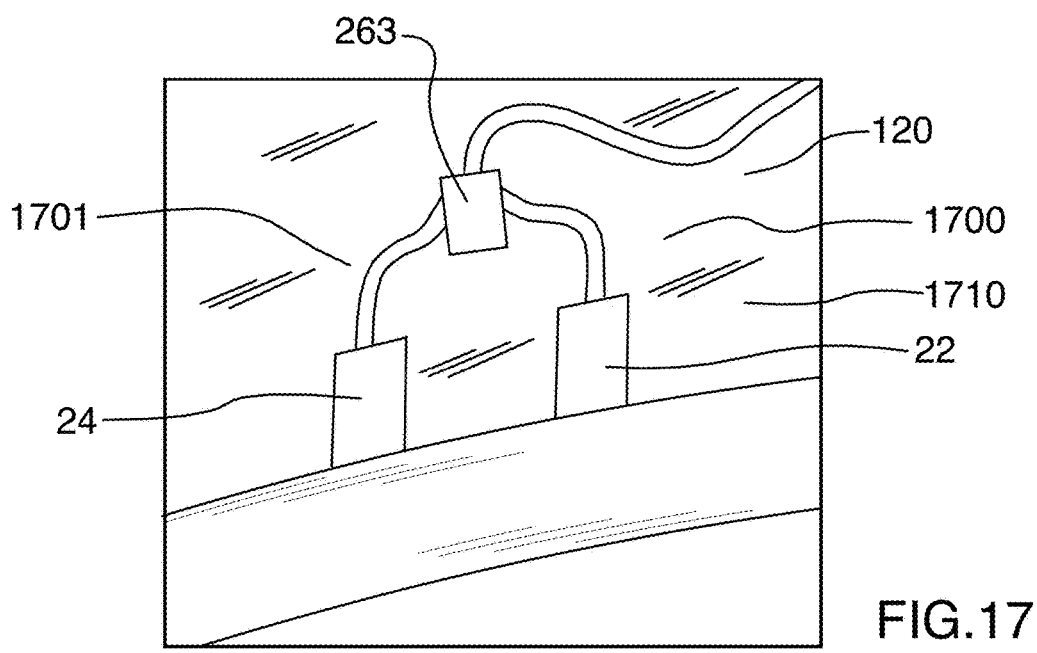
FIG. 17 is a front perspective view illustrating a capacitive sensor system for use with the hands-free operation system of FIG. 15 in accordance with an example embodiment of an aspect of the disclosure.
Figure 18:
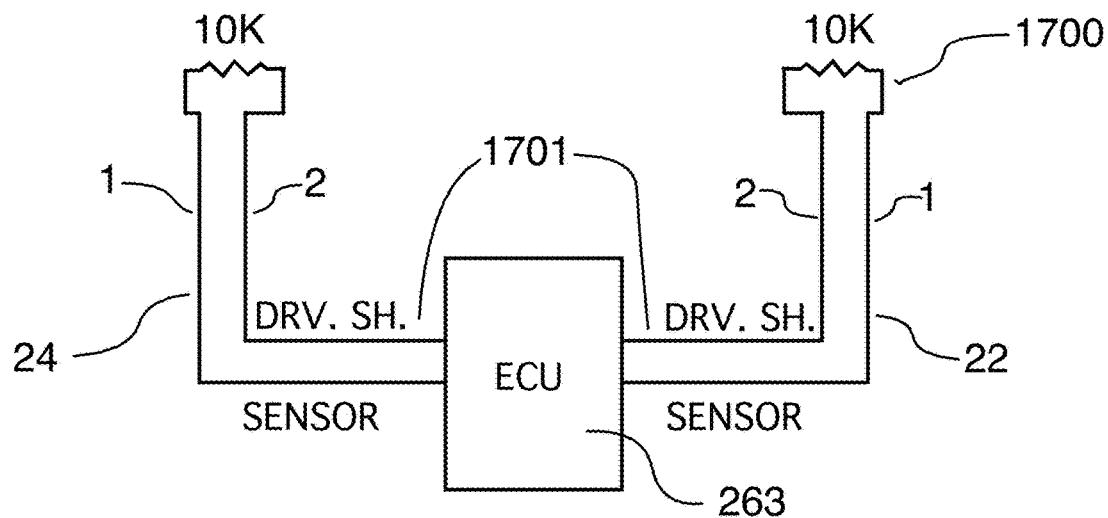
FIG. 18 is a block diagram illustrating the capacitive sensor system of FIG. 17 in accordance with an example embodiment of an aspect of the disclosure.
Figure 26:
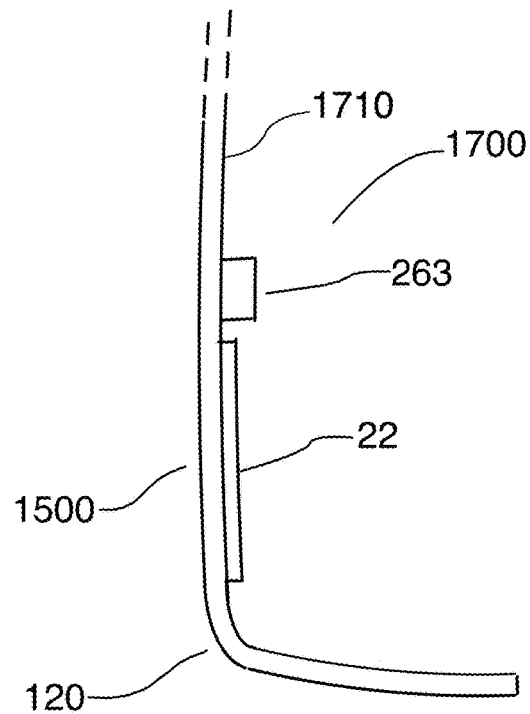
FIG. 26 is a cross-sectional view illustrating the capacitive sensor system of FIG. 17 in accordance with an example embodiment of an aspect of the disclosure.

FIG. 17 is a front perspective view illustrating a capacitive sensor system 1700 for use with the hands-free operation system 10 of FIG. 15 in accordance with an example embodiment of an aspect of the disclosure. FIG. 26 is a cross-sectional view illustrating the capacitive sensor system 1700 of FIG. 17 in accordance with an example embodiment of an aspect of the disclosure. And, FIG. 18 is a block diagram illustrating the capacitive sensor system 1700 of FIG. 17 in accordance with an example embodiment of an aspect of the disclosure. In FIGS. 17, 18, and 26, the capacitive sensor system 1700 includes first and second elongate capacitive proximity sensors 22, 24 mounted on the inner surface 1710 of the bumper skin, fascia, or bumper 120 of the vehicle 14 and coupled to a sensor ECU 263. The sensor ECU 263 is described above with reference to FIG. 5. The sensors 22, 24 are vertically oriented and are spaced apart along the periphery 1600 of the vehicle 14. The sensors 22, 24 may conform to the contours of the periphery 1600 of the vehicle 14. The sensor ECU 263 may be mounted on the inner surface 1710 of the bumper skin, fascia, or bumper 120 proximate to the sensors 22, 24. And, the sensors 22, 24 may be coupled to the sensor ECU 263 by an appropriate wiring harness or wiring 1701.

Figure 19:
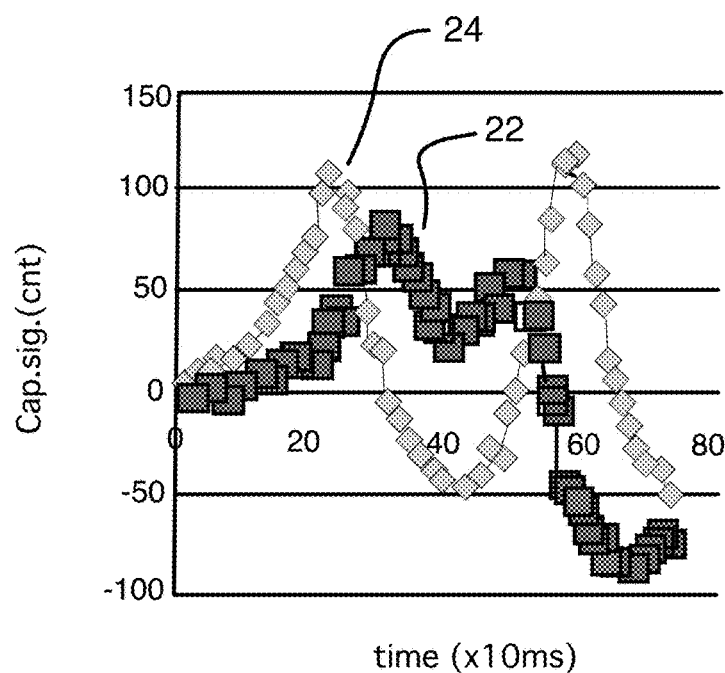
FIG. 19 is a graph illustrating capacitive signal level versus time for an "Up" hand or foot gesture and a "Down" hand or foot gesture for the capacitive sensor system of FIG. 17 in accordance with an example embodiment of an aspect of the disclosure.

FIG. 19 is a graph illustrating capacitive signal level versus time for an "Up" hand or foot gesture 1502 and a "Down" hand or foot gesture 1501 for the capacitive sensor system 1700 of FIG. 17 in accordance with an example embodiment of an aspect of the disclosure. Detecting a capacitive signal peak from the rearward sensor 24 followed by a capacitive signal peak from the forward sensor 22 may be interpreted as a liftgate "Up" hand or foot gesture 1502. Detecting a capacitive signal peak from the forward sensor 22 followed by a capacitive signal peak from the rearward sensor 24 may be interpreted as a liftgate "Down" hand or foot gesture 1501. If no time delay between capacitive signal peaks is detected, or if capacitive signal peaks overlap, or if a capacitive signal magnitude change is detected during liftgate motion, such may be interpreted as a liftgate "Stop" hand or foot gesture.

Figure 20:
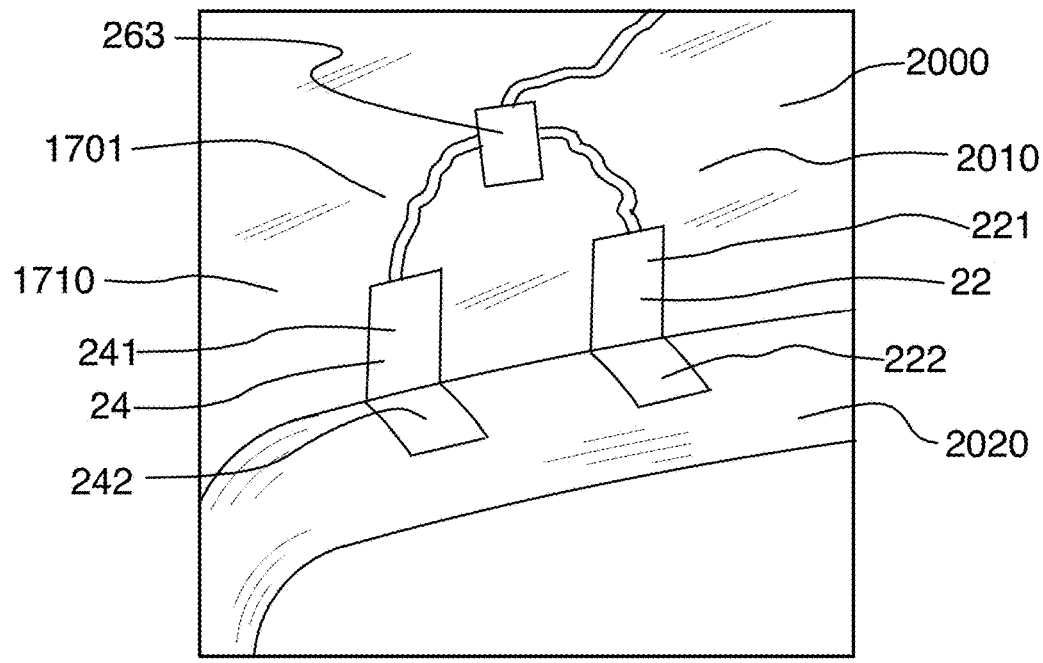
FIG. 20 is a front perspective view illustrating an alternate capacitive sensor system for use with the hands-free operation system of FIG. 15 in accordance with an example embodiment of an aspect of the disclosure.
Figure 21:
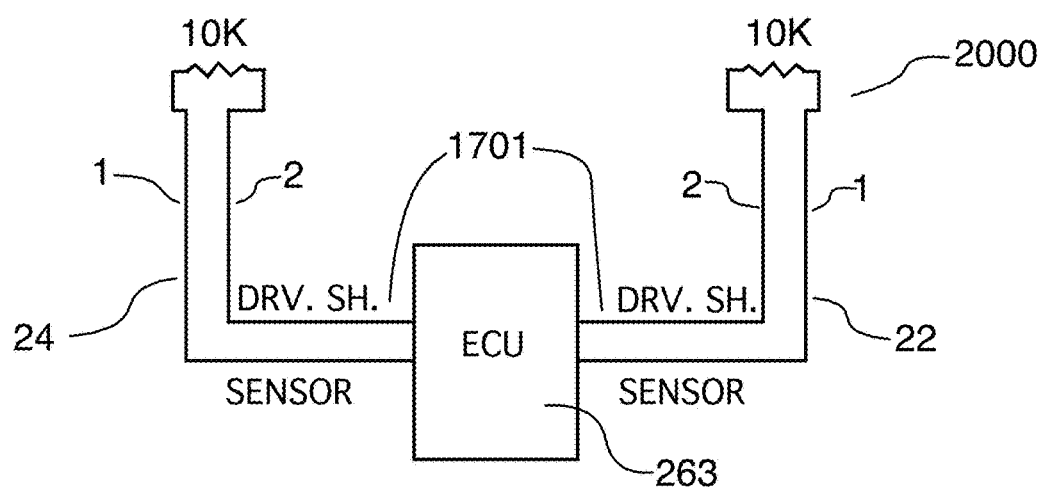
FIG. 21 is a block diagram illustrating the capacitive sensor system of FIG. 20 in accordance with an example embodiment of an aspect of the disclosure.
Figure 27:
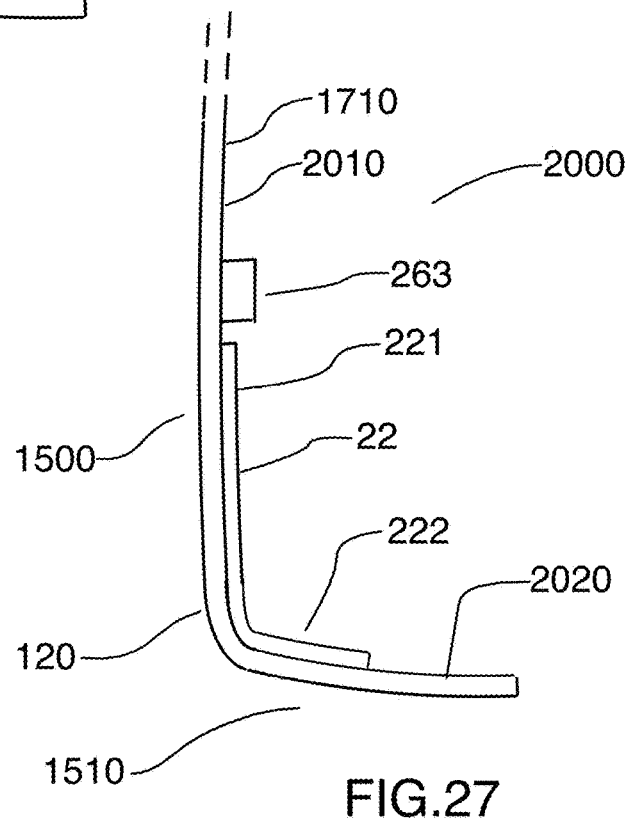
FIG. 27 is a cross-sectional view illustrating the capacitive sensor system of FIG. 20 in accordance with an example embodiment of an aspect of the disclosure.

FIG. 20 is a front perspective view illustrating an alternate capacitive sensor system 2000 for use with the hands-free operation system 10 of FIG. 15 in accordance with an example embodiment of an aspect of the disclosure. FIG. 27 is a cross-sectional view illustrating the capacitive sensor system 2000 of FIG. 20 in accordance with an example embodiment of an aspect of the disclosure. And, FIG. 21 is a block diagram illustrating the capacitive sensor system 2000 of FIG. 20 in accordance with an example embodiment of an aspect of the disclosure. In FIGS. 20, 21, and 27, the capacitive sensor system 2000 includes first and second elongate capacitive proximity sensors 22, 24 mounted on the inner surface 1710 of the bumper skin, fascia, or bumper 120 of the vehicle 14 and coupled to a sensor ECU 263. The sensor ECU 263 is described above with reference to FIG. 5. Each sensor 22, 24 may have a vertical or approximately vertical portion 221, 241 for extending along a vertical or approximately vertical portion 2010 of the inner surface 1710 and a horizontal or approximately horizontal portion 222, 242 for extending along a horizontal or approximately horizontal portion 2020 of the inner surface 1710. The horizontal portion 2020 may be the lower lip or rim of the bumper skin, fascia, or bumper 120 and may extend inwardly along or toward the underside of the vehicle 14. The horizontal portions 222, 242 of each sensor 22, 24 provide for improved detection of foot wave motions or gestures 1501, 1502 made in the volume 1510 proximate the sensors 22, 24 and under the bumper 120. The sensors 22, 24 are vertically oriented and are spaced apart along the periphery 1600 of the vehicle 14. The sensors 22, 24 may conform to the contours of the periphery 1600 of the vehicle 14. The sensor ECU 263 may be mounted on the inner surface 1710 (e.g., on the vertical portion 2010) of the bumper skin, fascia, or bumper 120 proximate to the sensors 22, 24. And, the sensors 22, 24 may be coupled to the sensor ECU 263 by an appropriate wiring harness or wiring 1701.

Figure 22:
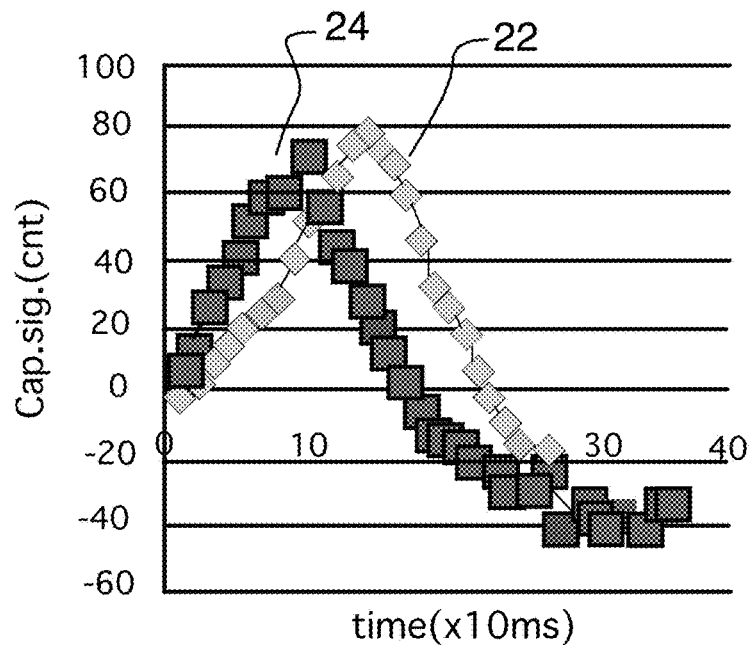
FIG. 22 is a graph illustrating capacitive signal level versus time for an "Up" hand or foot gesture for the capacitive sensor system of FIG. 20 in accordance with an example embodiment of an aspect of the disclosure.

FIG. 22 is a graph illustrating capacitive signal level versus time for an "Up" hand or foot gesture 1502 for the capacitive sensor system 2000 of FIG. 20 in accordance with an example embodiment of an aspect of the disclosure. Detecting a capacitive signal peak from the rearward sensor 24 followed by a capacitive signal peak from the forward sensor 22 may be interpreted as a liftgate "Up" hand or foot gesture 1502. Detecting a capacitive signal peak from the forward sensor 22 followed by a capacitive signal peak from the rearward sensor 24 may be interpreted as a liftgate "Down" hand or foot gesture 1501. If no time delay between capacitive signal peaks is detected, or if capacitive signal peaks overlap, or if a capacitive signal magnitude change is detected during liftgate motion, such may be interpreted as a liftgate "Stop" hand or foot gesture.

Figure 23:
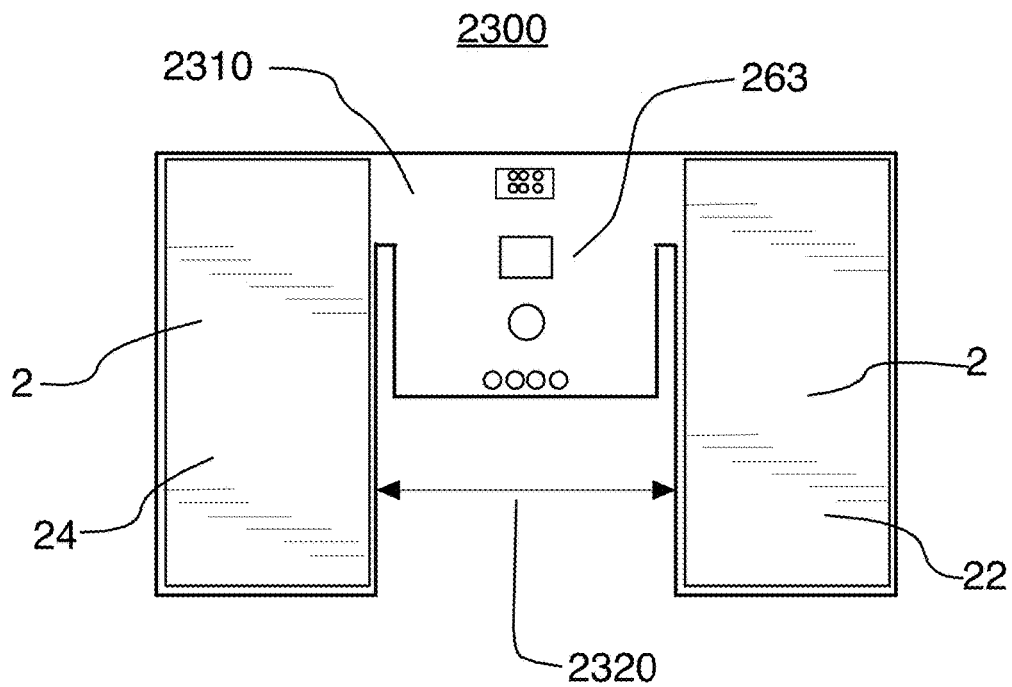
FIG. 23 is a front view illustrating a capacitive sensor module for use with the hands-free operation system of FIG. 15 in accordance with an example embodiment of an aspect of the disclosure.
Figure 24:
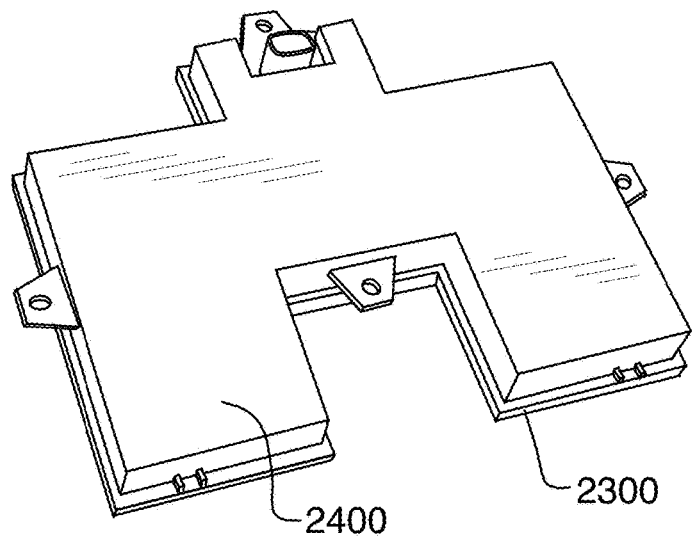
FIG. 24 is a front perspective view illustrating the capacitive sensor module of FIG. 23 with its case installed in accordance with an example embodiment of an aspect of the disclosure.
Figure 28:
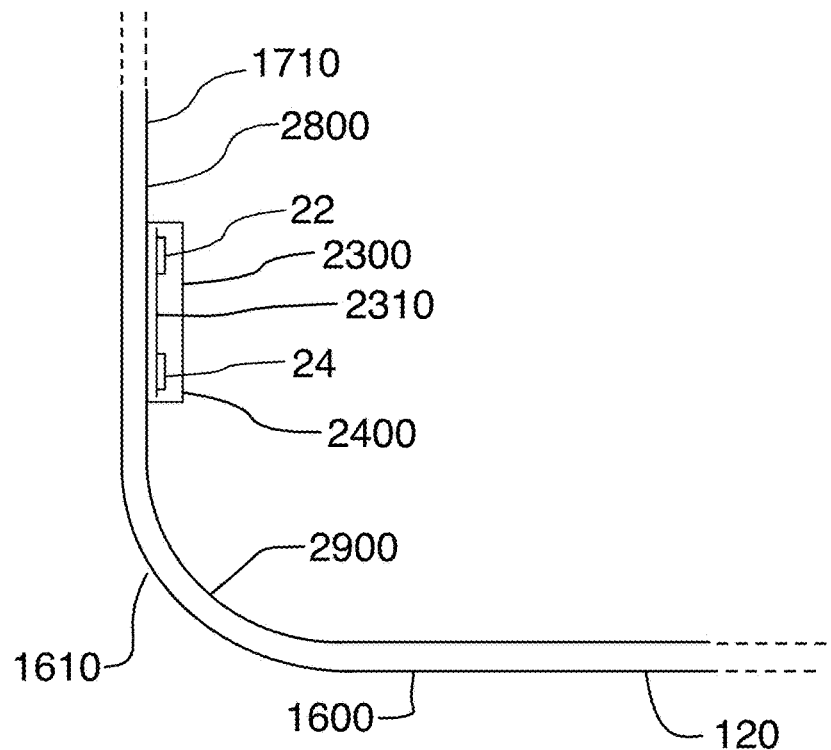
FIG. 28 is top view illustrating the capacitive sensor module of FIG. 23 installed on a flat portion of an inner surface of a bumper skin, fascia, or bumper in accordance with an example embodiment of an aspect of the disclosure.
Figure 29:
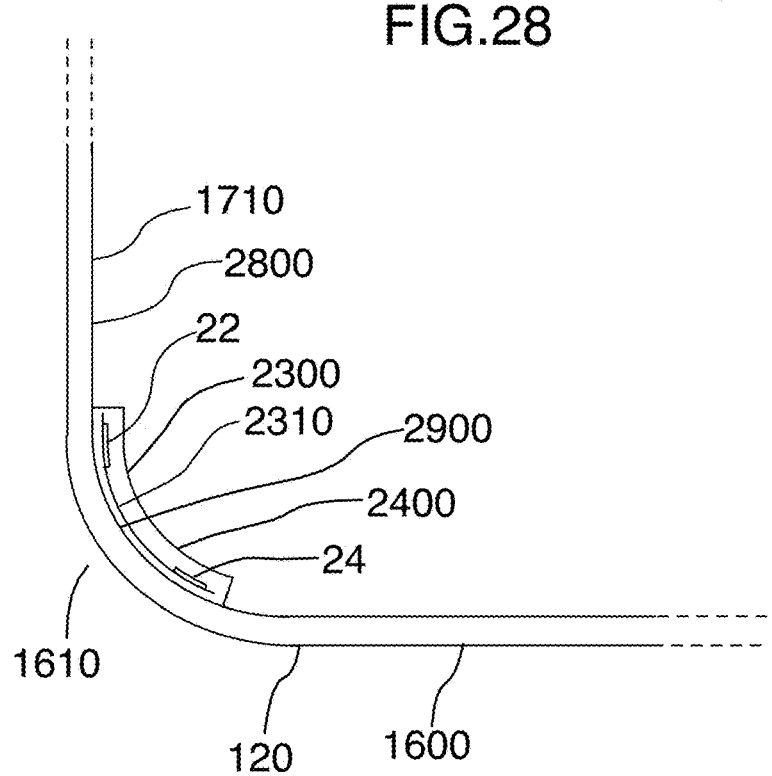
FIG. 29 is top view illustrating the capacitive sensor module of FIG. 23 installed on a curved portion of an inner surface of a bumper skin, fascia, or bumper in accordance with an example embodiment of an aspect of the disclosure; and, FIG. 30 is rear perspective view illustrating an alternate hands-free operation system for a liftgate of a vehicle having multiple vertically oriented, horizontally oriented, and angled sensors in accordance with an example embodiment of an aspect of the disclosure.

FIG. 23 is a front view illustrating a capacitive sensor module 2300 for use with the hands-free operation system 10 of FIG. 15 in accordance with an example embodiment of an aspect of the disclosure. FIG. 24 is a front perspective view illustrating the capacitive sensor module 2300 of FIG. 23 with its case 2400 installed in accordance with an example embodiment of an aspect of the disclosure. FIG. 28 is top view illustrating the capacitive sensor module 2300 of FIG. 23 installed on a flat portion 2800 of an inner surface 1710 of a bumper skin, fascia, or bumper 120 in accordance with an example embodiment of an aspect of the disclosure. And, FIG. 29 is top view illustrating the capacitive sensor module 2300 of FIG. 23 installed on a curved portion 2900 of an inner surface 1710 of a bumper skin, fascia, or bumper 120 in accordance with an example embodiment of an aspect of the disclosure. The capacitive sensor module 2300 is a prepackaged version of the capacitive sensor system 1700 of FIG. 17. The capacitive sensor module 2300 includes a printed circuit board 2310 upon which is mounted or formed the first and second elongate capacitive proximity sensors 22, 24 and the sensor ECU 263. The printed circuit board 2310 maintains a fixed separation or spacing 2320 between the sensors 22, 24. The sensor ECU 263 may be mounted on the printed circuit board 2310 between the sensors 22, 24. As shown in FIG. 24, the capacitive sensor module 2300 may be enclosed in a housing or case 2400 for protection and ease of installation in a vehicle 14. The printed circuit board 2310 may be a flexible printed circuit board to allow the printed circuit board 2310 and the sensors 22, 24 mounted thereon to conform to the contours (e.g., flat and curved portions 2800, 2900 of the inner surface 1710 of the bumper skin, fascia, or bumper 120, etc.) of the periphery 1600 of the vehicle 14. The housing or case 2400 may also be flexible. The sensors 22, 24 may operate in a manner similar to that described above with reference to FIG. 3.

According to one example embodiment, each sensor 22, 24 shown in FIG. 23 may have a height of approximately 100 mm and a width of approximately 50 mm. The sensors 22, 24 may be separated by a distance 2320 of approximated 70 mm. And, the circuit board 2310 may an overall height of approximately 100 mm and an overall width of approximately 170 mm.

Figure 25:
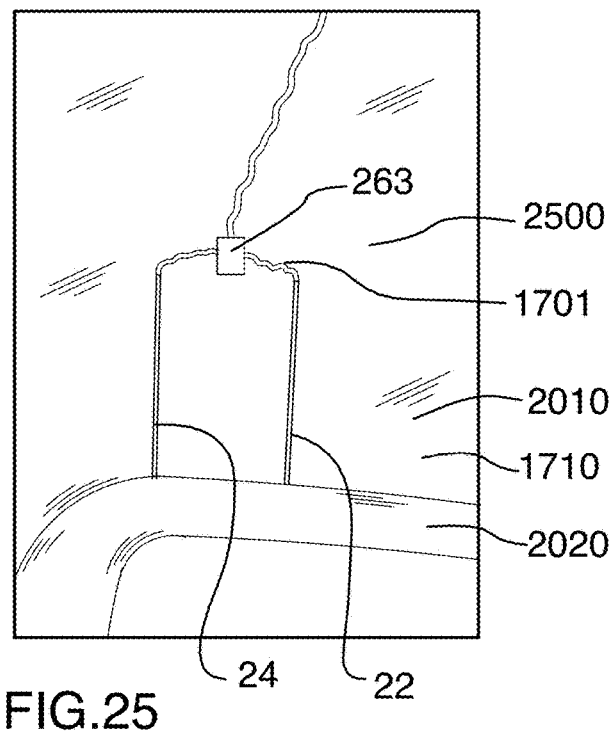
FIG. 25 is a front perspective view illustrating another alternate capacitive sensor system for use with the hands-free operation system of FIG. 15 in accordance with an example embodiment of an aspect of the disclosure.

FIG. 25 is a front perspective view illustrating another alternate capacitive sensor system 2500 for use with the hands-free operation system 10 of FIG. 15 in accordance with an example embodiment of an aspect of the disclosure. In FIG. 25, the sensors 22, 24 are elongate capacitive proximity sensors as described above and shown in FIG. 3. The capacitive shield electrode 2 of these sensors 22, 24 is in the form of a metal wire. In contrast, the capacitive shield electrode 2 of the sensors 22, 24 shown in FIGS. 17-24 and 28-29 is in the form of a flat metal strip. Each sensor 22, 24 shown in FIGS. 7-24 and 28-29 may operate in a manner similar to that described above with reference to FIG. 3.

Figure 30:
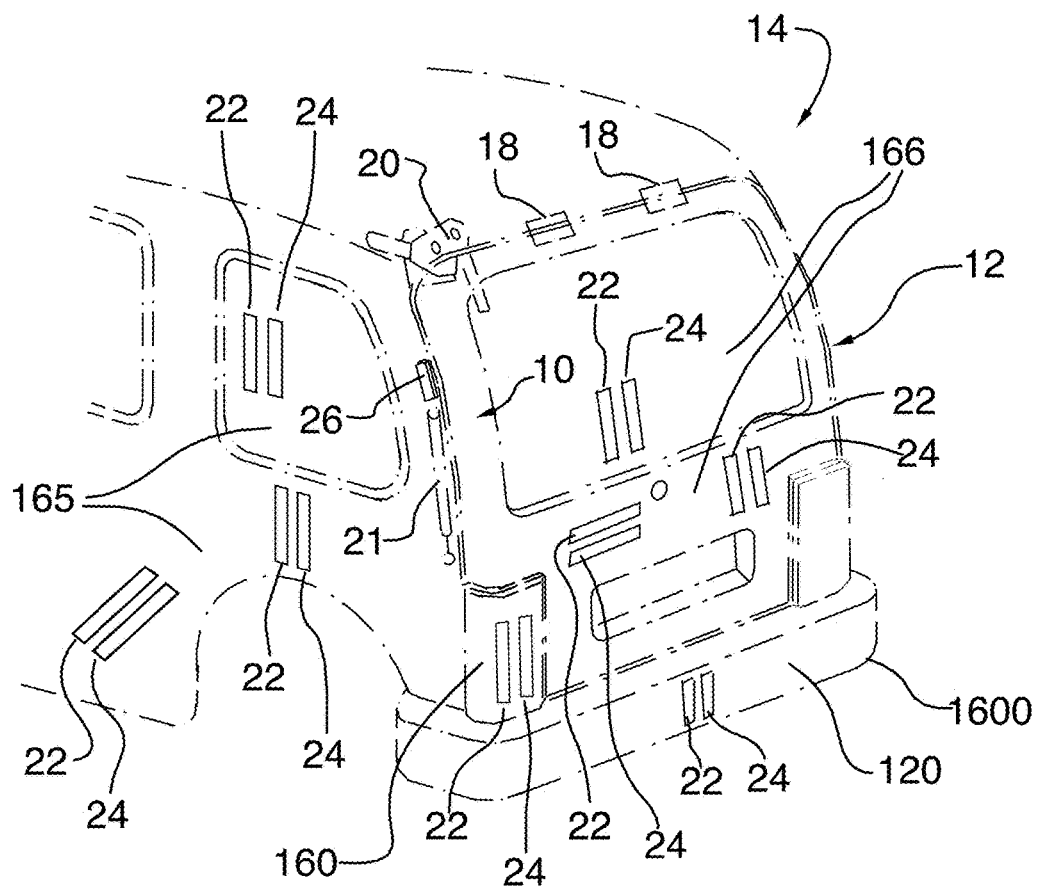

FIG. 30 is rear perspective view illustrating an alternate hands-free operation system 10 for a liftgate 12 of a vehicle 14 having multiple vertically oriented, horizontally oriented, and angled sensors 22, 24 in accordance with an example embodiment of an aspect of the disclosure. FIG. 30 shows that the sensors 22, 24 may be mounted in a number of different locations on the periphery 1600 of the vehicle 14. For example, in addition to mounting on the bumper skin, fascia, or bumper 120 as described above, the sensors 22, 24 may also be mounted in, on, or under one or more of a side body panel or glass 165, a rear body panel or glass 166, and a headlight or taillight 160. With respect to headlight or taillight 160 mounting, the sensors 22, 24 may be mounted on the inner surface of the lens of the headlight or taillight 160. Alternatively, the sensors 22, 24 may be mounted on an inner surface or an outer surface of the bulb housing of the headlight or taillight 160 (i.e., behind the lens). In addition, according to one example embodiment, the sensors 22, 24 may be formed on, printed on, or molded into a bumper skin or fascia 120, a body panel or glass 165, 166, a headlight or taillight 160 lens or bulb housing, and/or a housing of an ECU 263.

According to an alternate example embodiment, the sensors 22, 24 described above with reference to FIGS. 15-30 may be horizontally or approximately horizontally oriented and vertically or approximately vertically spaced. According to another alternate example embodiment, the sensors 22, 24 described above with reference to FIGS. 15-30 may be oriented at an angle (e.g., 45 degrees) and vertically or approximately vertically spaced. In these alternate example embodiments, and referring to FIG. 30, to reduce the occurrence of false sequential sensor activations caused by water running down the exterior surfaces of the vehicle 14, sequential activations of the lower sensor (e.g., 24) followed by the upper sensor (e.g., 22) may be recognized first or may be the only sequential activations recognized.

The above embodiments may contribute to an improved method and system 10 for hands-free operation of liftgates 12 of vehicles 14 and other devices and may provide one or more advantages. First, the system 10 reduces unintended operation of the latch 110 and liftgate 12 by requiring a user to indicate his or her intention to operate the latch 110 and liftgate 12 hands-free at the side 195 of the vehicle 14 and then move to the rear 190 of the vehicle 14 to be authenticated. Second, the system 10 allows for true hands-free operation. A user need not touch or pull a handle or push a button on a fob 230 to operate the latch 110 and liftgate 12. Third, there may be a reduction in the numbers of components required for proximity sensing and authentication. Fourth, in some embodiments, there may be a simplification in the indication of intent such that the user is not required to add motions such as changes in direction that may require awkward movements.

Thus, according to one example embodiment, there is provided a method for operating a closure panel 12 of a vehicle 14, comprising: using a processor 520, determining whether a first proximity sensor 22 and a second proximity sensor 24 located on a periphery 1600 of the vehicle 14 have been sequentially activated to indicate an object 1020 moving across the first proximity sensor 22 and the second proximity sensor 24; and, controlling the closure panel 12 to open or close when the first proximity sensor 22 and the second proximity sensor 24 have been sequentially activated.

In the above method, the first proximity sensor 22 and the second proximity sensor 24 may be spaced apart 2320 horizontally or approximately horizontally along the periphery 1600. The first proximity sensor 22 and the second proximity sensor may be elongate capacitive proximity sensors. The first proximity sensor 22 and the second proximity sensor 24 may be vertically or approximately vertically oriented. Each of the first proximity sensor 22 and the second proximity sensor 24 may have a respective horizontal or approximately horizontal portion 222, 242, the horizontal or approximately horizontal portion 222, 242 extending horizontally or approximately horizontally along or toward an underside of the vehicle 14.

Also in the above method, the first proximity sensor 22 and the second proximity sensor 24 may be mounted or formed on a printed circuit board 2310. The printed circuit board 2310 may be a flexible printed circuit board. The flexible printed circuit board 2310 may conform to a contour 1610, 2900 of the periphery 1600. The printed circuit 2310 board may be enclosed in a case 2400. The printed circuit board 2310 may have mounted thereon a controller 263 for monitoring the first proximity sensor 22 and the second proximity sensor 24. The controller 263 may be communicatively coupled to a central controller 26 for the vehicle 14.

Also in the above method, the object 1020 may be moved in a volume 1500 adjacent, over, or proximate the first proximity sensor 22 and the second proximity sensor 24. The first proximity sensor 22 and the second proximity sensor 24 may be sequentially activated by a horizontal or approximately horizontal movement of the object 1020. The object 1020 may be one or more of a user's hand 920, foot 1020, arm, leg, limb, and body or part thereof.

The method may further include: determining an order of activation of the first proximity sensor 22 and the second proximity sensor 24; when the first proximity sensor 22 is activated before the second proximity sensor 24, controlling the closure panel 12 to close; and, when the second proximity sensor 24 is activated before the first proximity sensor 22, controlling the closure panel 12 to open. The method may further include: when the first proximity sensor 22 and the second proximity sensor 24 are activated simultaneously or approximately simultaneously while the closure panel 12 is moving, controlling the closure panel 12 to stop moving. The determining of the order of activation of the first proximity sensor 22 and the second proximity sensor 24 may further include comparing respective occurrences of capacitive signal level peak magnitude for the first proximity sensor 22 and the second proximity sensor 24. The method may further include authenticating a fob 230 with an authentication system 200, wherein the determining whether the first proximity sensor 22 and the second proximity sensor 24 located on the periphery 1600 of the vehicle 14 have been sequentially activated may be performed when the fob 230 has been authenticated. The authenticating the fob 230 with the authentication system 200 may further include monitoring an antenna 170, 180 located on the vehicle 14 to determine whether the fob 230 is within a predetermined distance from the vehicle 14. The determining whether the first proximity sensor 22 and the second proximity sensor 24 located on the periphery 1600 of the vehicle 14 have been sequentially activated may be performed when the fob 230 is within the predetermined distance and has been authenticated.

Also in the above method, the closure panel may be a liftgate 12. The periphery 1600 may be a side 195 of the vehicle 14. The periphery 1600 may be an end 190 of the vehicle 14. The periphery 1600 may be a corner 1610 of the vehicle 14. The first proximity sensor 22 and the second proximity sensor 24 may be mounted in, on, or under a glass or panel 165, 166 of the vehicle 14. The glass or panel may be a rear quarter glass 165 or rear quarter panel 165, respectively. The first proximity sensor 22 and the second proximity sensor 24 may be mounted in a taillight 160 or headlight of the vehicle 14. The first proximity sensor 22 and the second proximity sensor 24 may be mounted on an inner surface of a lens of the taillight 160 or headlight. The first proximity sensor 22 and the second proximity sensor 24 may be mounted in a bumper 120 of the vehicle 14. The bumper may be a rear bumper 120. The first proximity sensor 22 and the second proximity sensor 24 may be positioned at or on either side of a corner 1610 of the periphery 1600. The corner may be a rear corner 1610. And, the first proximity sensor 22 and the second proximity sensor 24 may be formed on, printed on, or molded into one or more of a bumper skin or fascia 120, a body panel or glass 165, 166, a headlight or taillight 160 lens or bulb housing, and a housing (e.g., 2400) of a controller 263.

According to one example embodiment, each of the above described method steps may be implemented by a respective software module 531. According to another example embodiment, each of the above described method steps may be implemented by a respective hardware module 521. According to another example embodiment, each of the above described method steps may be implemented by a combination of software and hardware modules 531, 521.

While this disclose is primarily discussed as a method, a person of ordinary skill in the art will understand that the apparatus discussed above with reference to a controller 26 may be programmed to enable the practice of the method of the disclosure. Moreover, an article of manufacture for use with a controller 26, such as a pre-recorded storage device or other similar computer readable medium or computer program product including program instructions recorded thereon, may direct the controller 26 to facilitate the practice of the method of the disclosure. It is understood that such apparatus, products, and articles of manufacture also come within the scope of the disclosure.

In particular, the sequences of instructions which when executed cause the method described herein to be performed by the controller 26 may be contained in a data carrier product according to one embodiment of the invention. This data carrier product may be loaded into and run by the controller 26. In addition, the sequences of instructions which when executed cause the method described herein to be performed by the controller 26 may be contained in a computer software product or computer program product (e.g., comprising a non-transitory medium) according to one embodiment of the invention. This computer software product or computer program product may be loaded into and run by the controller 26. Moreover, the sequences of instructions which when executed cause the method described herein to be performed by the controller 26 may be contained in an integrated circuit product (e.g., a hardware module or modules 521) which may include a coprocessor or memory according to one embodiment of the invention. This integrated circuit product may be installed in the controller 26.

The embodiments of the disclosure described above are intended to be examples only. Those skilled in this art will understand that various modifications of detail may be made to these embodiments, all of which come within the scope of the disclosure.

What is claimed is:

1. A method of operating a closure panel of a vehicle, comprising:
    locating a sensor module on a periphery of a vehicle having at least one proximity sensor;
    authenticating a fob with an authentication system;
    determining whether the at least one proximity sensor has been activated after the fob has been authenticated without requirement of a waving gesture by a user; and
    controlling the closure panel to open or close in response to activation of the at least one proximity sensor as well as authentication of the fob.

2. The method of claim 1, further comprising providing feedback to the user to indicate activation of the at least one proximity sensor by providing one of an audible or visual feedback to the user.

3. The method of claim 1, wherein the at least one proximity sensor is located behind one of a bumper or a panel of the vehicle.

4. The method of claim 1, wherein the at least one proximity sensor comprises a radio frequency sensor.

5. The method of claim 1, wherein determining whether the at least one proximity sensor has been activated after the fob has been authenticated without requirement of the waving gesture by the user is further defined as determining whether the at least one proximity sensor has been activated after the fob has been authenticated without requirement of the waving gesture by the user comprising a change in direction of motion.

6. The method of claim 1, wherein determining whether the at least one proximity sensor has been activated after the fob has been authenticated without requirement of the waving gesture by the user includes approaching the at least one proximity sensor by the user.

7. The method of claim 1, wherein determining whether the at least one proximity sensor has been activated after the fob has been authenticated without requirement of the waving gesture by the user includes a activating the at least one proximity sensor for a required period of time.

8. The method of claim 1, wherein determining whether the at least one proximity sensor has been activated after the fob has been authenticated without requirement of the waving gesture by the user includes activating the at least one proximity sensor by the user standing adjacent the vehicle without requirement to wave a foot.

9. The method of claim 1, wherein determining whether the at least one proximity sensor has been activated after the fob has been authenticated without requirement of the waving gesture by the user includes determining if the at least one proximity sensor is inactive followed by the activation of the at least one proximity sensor.

10. A method of operating a closure panel of a vehicle, comprising:
    locating a sensor module on a periphery of the vehicle having at least one proximity sensor being radio frequency based and installed behind a vehicle bumper directed for activation adjacent the side of the vehicle;
    authenticating a fob with an authentication system;
    determining whether the at least one proximity sensor has been activated after the fob has been authenticated by the user standing beside the vehicle without the requirement to wave a foot; and controlling the closure panel to open or close in response to activation of the at least one proximity sensor as well as authentication of the fob.

11. The method of claim 10, wherein determining whether the at least one proximity sensor has been activated includes determining if the at least one proximity sensor is inactive followed by the activation of the at least one proximity sensor for a period of time.

12. The method of claim 11, further comprising providing feedback to the user to indicate activation by providing one of an audible or visual feedback to the user.

13. A hands-free operating system for a closure panel of a vehicle, the operating system comprising:
   a sensor module located on a periphery of the vehicle having at least one proximity sensor;
   an authentication system for authenticating a fob; and
   a controller in communication with the sensor module and the authentication system and operable for determining whether the at least one proximity sensor has been activated after the fob has been authenticated without a requirement of a waving gesture by a user, and controlling the closure panel to open or close in response to activation of the at least one proximity sensor as well as authentication of the fob.

14. The operating system of claim 13, wherein the sensor module is installed behind a vehicle bumper directed for activation adjacent the bumper such that the user standing beside the vehicle activates the at least one proximity sensor without the requirement to wave a foot under the vehicle.

15. The operating system of claim 13, wherein the sensor module is located on a side of the vehicle adjacent to a rear wheel-well such that the user standing beside the vehicle activates the at least one proximity sensor without the requirement to wave a foot within the wheel-well or under the vehicle.

16. The operating system of claim 13 wherein the controller is further operable for providing feedback to indicate activation of the at least one proximity sensor, wherein the feedback comprises providing one of an audible or visual feedback.

17. The operating system of claim 13, wherein the at least one proximity sensor is located behind one of a bumper or a panel of the vehicle.

18. The operating system of claim 13 wherein the periphery of the vehicle is at least one of the side of the vehicle and a rear corner of the vehicle.

19. The operating system of claim 13, wherein the at least one proximity sensor comprises a radio frequency sensor.

20. The operating system of claim 13, wherein determining whether the at least one proximity sensor has been activated without requirement of a gesture by a user includes activating the at least one proximity sensor for a required period of time.

* * * * *